(12) United States Patent
Burdick et al.

(10) Patent No.: US 7,694,001 B2
(45) Date of Patent: Apr. 6, 2010

(54) CONFIGURATION STATE MANAGEMENT SYSTEM, METHOD AND APPARATUS

(75) Inventors: Christopher Robert Burdick, Leesburg, VA (US); David Edward Ray, McLean, VA (US)

(73) Assignee: VT iDirect, Inc., Herndon, VA (US)

( * ) Notice: Subject to any disclaimer, the term of this patent is extended or adjusted under 35 U.S.C. 154(b) by 1048 days.

(21) Appl. No.: 11/012,343

(22) Filed: Dec. 16, 2004

(65) Prior Publication Data
US 2005/0165954 A1    Jul. 28, 2005

Related U.S. Application Data

(60) Provisional application No. 60/543,537, filed on Feb. 12, 2004, provisional application No. 60/530,264, filed on Dec. 18, 2003.

(51) Int. Cl.
G06F 15/16    (2006.01)

(52) U.S. Cl. .................................... 709/228; 709/229

(58) Field of Classification Search .................. 709/226
See application file for complete search history.

(56) References Cited

U.S. PATENT DOCUMENTS

| 2002/0199012 | A1* | 12/2002 | Cable et al. | 709/233 |
| 2003/0221008 | A1* | 11/2003 | England et al. | 709/226 |
| 2004/0105415 | A1* | 6/2004 | Fujiwara et al. | 370/338 |

* cited by examiner

*Primary Examiner*—Vivek Srivastava
*Assistant Examiner*—Ryan J Jakovac
(74) *Attorney, Agent, or Firm*—Oblon, Spivak, McClelland, Maier & Neustadt, L.L.P.

(57) ABSTRACT

A communication system, method, computer program product, and apparatus include common equipment shared between multiple independently administered networks. The common equipment is reconfigurable and expandable and provides changed communication capacity and functions when additional elements are added or reconfigured. Configurable features include, for example, communication bandwidth, Quality of Service, and a number of communication satellites included in the communication system. The common equipment includes expandable elements including, for example, a single hub modem chassis that can expand to communicate with more than one communication satellite and a protocol processor that can share a protocol processing task with another protocol processors.

18 Claims, 24 Drawing Sheets

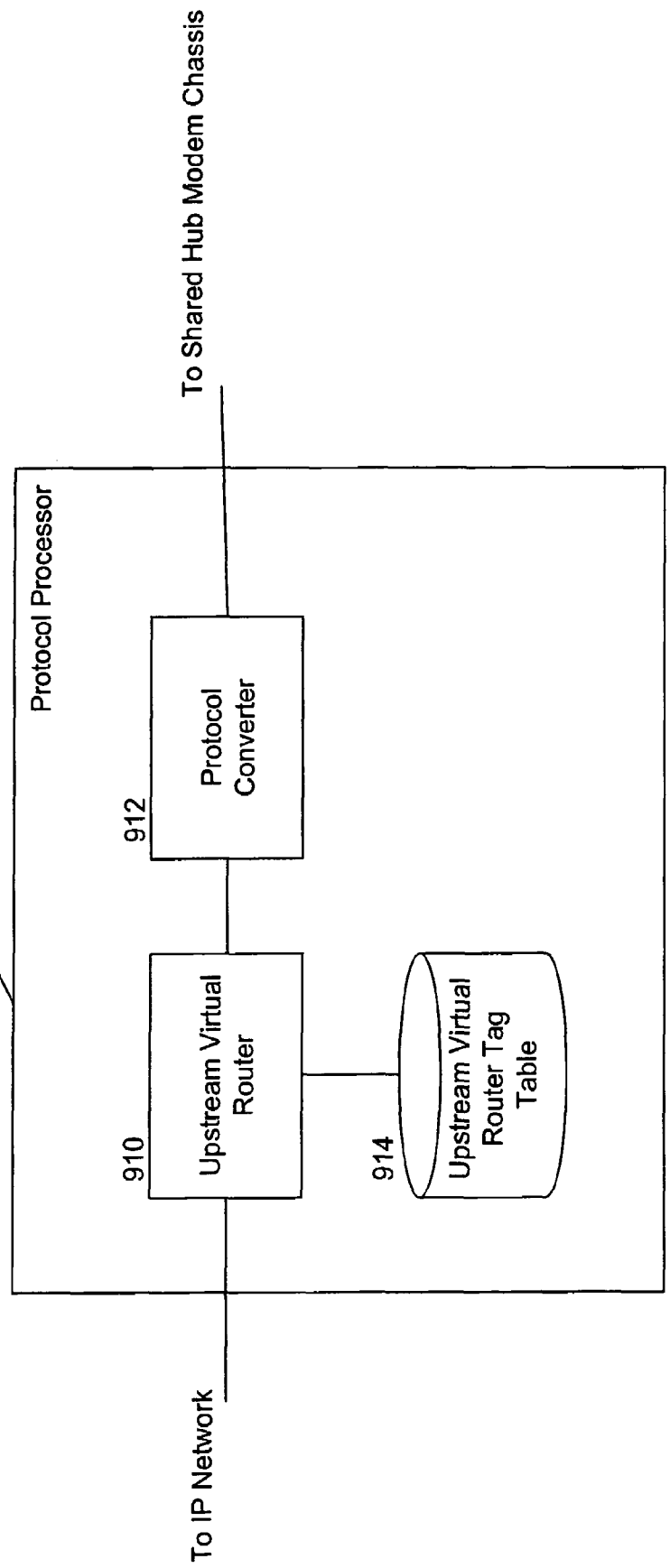

| CONFIGURATION STATE | NETWORK ELEMENT | MEANING |
|---|---|---|
| Nominal | Network, Chassis, Line Card, Remote | The element is completely configured, is alive in the network, and there are no unapplied changes. |
| Changes Pending | Network, Chassis, Line Card, Remote | The element is completely configured and is alive in the network. There are changes in the database that have not been applied. |
| Incomplete | Network, Chassis, Line Card, Remote | The element is only partially configured; one or more key components of the configuration are unspecified (e.g. carriers, IP address, serial number) |
| Never Applied | Network, Chassis, Line Card, Remote | The element is completely configured but the configuration has never been applied to the element. |
| Deactivated | Remote | The remote modem was at one time active in the network, but it has been deactivated. |

Fig. 12

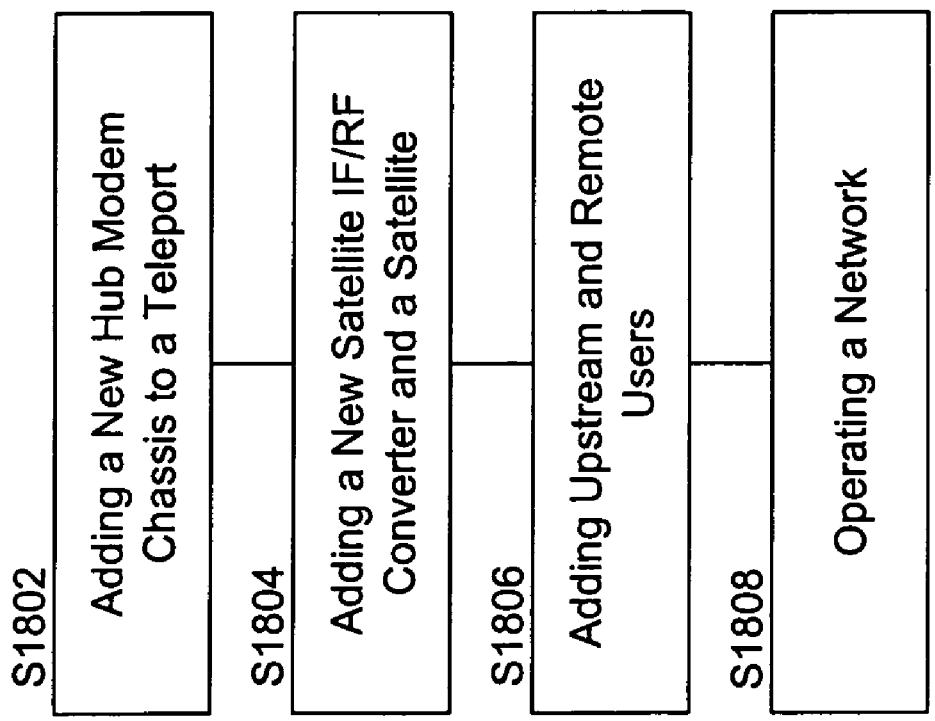

US 7,694,001 B2

CONFIGURATION STATE MANAGEMENT SYSTEM, METHOD AND APPARATUS

CROSS REFERENCE TO RELATED APPLICATIONS

The present application contains subject matter related to that disclosed in commonly owned U.S. patent application Ser. No. 11/012,256, entitled HUB MODEM SYSTEM, METHOD AND APPARATUS, filed Dec. 16, 2004; U.S. patent application Ser. No. 11/012,269, entitled VIRTUAL ROUTER SYSTEM, METHOD AND APPARATUS, filed Dec. 16, 2004; U.S. patent application Ser. No. 11/012,359 entitled VIRTUAL NETWORK OPERATOR SYSTEM, METHOD AND APPARATUS, filed Dec. 16, 2004; and U.S. patent application Ser. No. 11/012,270, entitled SCALABLE COMMUNICATION SYSTEM, METHOD AND APPARATUS, and claims priority to U.S. provisional patent application Ser. No. 60/530,264, entitled NETWORK MANAGEMENT SYSTEM, filed Dec. 18, 2003, and U.S. provisional patent application Ser. No. 60/543,537, entitled METHOD AND APPARATUS AND SYSTEM FOR SHARING A NETWORK HUB BETWEEN MULTIPLE AND INDEPENDENTLY ADMINISTERED SATELLITE NETWORKS, filed Feb. 12, 2004, the entire contents of each of which being incorporated herein by reference.

BACKGROUND OF THE INVENTION

1. Field of the Invention

The present invention relates to communication networks and more particularly to a communication system including shared, independently managed communication networks. The present invention also relates to a method of providing shared independently managed communication networks, and to an apparatus in a shared independently administered network. Further, the present invention relates to communication networks that are satellite communication networks.

2. Discussion of the Background

A conventional satellite network communication system business method includes a satellite network provider and satellite network users. The satellite network provider obtains all the equipment, including teleport, remote equipment and related software, and provides communication network services to network users for a fee.

FIG. 16 shows an example of a conventional satellite network communication system including network upstream users 1602 and network remote users 1612 that communicate via Internet Protocol (IP) network 1604, teleport 1606, satellite IF/RF converter 1608 and satellite 1610. Further, a network operator 1614 performs network management functions. A teleport 1606 provides a connection between an IP network and a single IF/RF converter 1608 with a connection to a single satellite 1610.

FIG. 17A shows an example of the composition of teleport 1606, including processor 1702 and dedicated hub modem chassis 1706.

FIG. 17B shows another example of a background teleport 1700 that is similar to teleport 1606. However, background teleport 1700 includes connections to two satellite IF/RF converters connected to two different satellites. Teleport 1700 includes processor A 1702 connected to an IP network, processor B 1704 connected to an IP network, a dedicated hub modem chassis A 1706, and a dedicated hub modem chassis B 1708. Dedicated hub modem chassis A 1706 provides an intermediate frequency (IF) connection to the satellite A IF/RF converter, which in turn connects via a radio frequency (RF) path to satellite A (not shown), and dedicated hub modem chassis B 1708 provides an IF connection to the satellite B IF/RF converter, which in turn connects via a RF path to satellite B (not shown).

Thus, in this system a dedicated hub modem chassis is required for each satellite in a teleport, and each dedicated hub modem chassis can provide a connection to only a single satellite, via a satellite IF/RF converter. As recognized by the present inventors, additional expenses are unnecessarily incurred when more than one satellite network is to be operated at a teleport. In addition, the addition of a new network necessitates installation and administration of an additional teleport or an additional hub chassis for the new network. Thus, considerable planning and expense are incurred when adding a new network.

FIG. 18 shows an example of a conventional method of operating a satellite communications network. When a new independently managed network is required, a new hub modem chassis must be added to a teleport, as shown in step S1802. In addition, a new satellite IF/RF converter and a new satellite must be added to the communication system, as shown in step S1804. Next, the method includes adding upstream and remote users, as shown in step S1806, and operating the network, as shown in step S1808.

As recognized by the present inventors, it is difficult to incrementally add capabilities for new users. For example, to create a new independently managed private satellite network, a satellite system provider must obtain, install, configure and manage at least an additional hub modem chassis and line cards for the additional hub modem chassis.

Also, it is difficult to increase or decrease the amount of bandwidth allocated to a particular network. To increase the number of carriers allocated to a particular network (i.e., upstream) or adding a new network (i.e., modem group and associated equipment for a network) in the background art, it is necessary to add a teleport or add an additional hub modem chassis, thereby incurring significant capital expense.

An alternative background approach is to combine a plurality of smaller customers on a single network, and varying the amount of bandwidth allocated to each customer on that network as required. However, in that alternative approach each network user does not have control over key network parameters like IP address assignment, QoS, number of upstreams, and frame lengths. Further, security (e.g., password scheme, level of encryption (at least up to Layer 3)) options are the same for all satellite network system users in the background approach.

Further, this alternative background approach does not allow each user to customize the single network for their particular application (e.g., VoIP, web browsing, shared database, etc . . . ). Thus, customers are not able to independently take advantage of all network features and are required to coordinate the control of those features with a third party network operator, thereby increasing expense and reducing customer flexibility and autonomy. Alternatively, to get flexible control over these network parameters, each user of the background approach would disadvantageously need to spend additional money to set up independent networks dedicated to their application and tailored to their needs.

Further, this conventional satellite communication network includes a large number of interrelated configuration parameters. The configuration parameters are interrelated because changes to parameters in one part of the communication network has an impact on another part, and may require further changes to that other part of the network. A background method of configuring a satellite communication network includes changing each of the parameters one at a time from a network operator workstation and after the final parameter is changed, waiting until the system stabilizes to see if the changed parameters had the desired effect. For example, to change an IP address of a remote user in a background system, a network operator enters the new IP address in the remote user software, and then enters the new IP address in each related computer that communicates with the remote user's IP address. Then, after the final IP address is changed, the operator waits to see if the change had the desired effect.

The present inventors recognized that a problem with this method of configuring a satellite communication network is that as configuration parameters are changed, those changes may cause undesirable temporary effects in the communication network. Further, those effects may ripple through the communication network, causing problems that are more difficult to repair. For example, when changing the IP address in the example shown above, after changing the IP address on the remote user software, a remote user loses the ability to communicate on the IP network, and may start a communication recovery action that may include sending messages to a domain name server for example, or may include other error recovery attempts that in turn may result in other errors that must be corrected. Consequently, operation of such a communication system may be disadvantageously disrupted during a change of configuration.

In addition, each user of a satellite network system shares a single IP address space. For example, if multiple independent users on a single network have network equipment with the same IP addresses, in this conventional system, those independent users are required to change their IP addresses in a coordinated manner to ensure that no two devices have the same IP address. Thus, users of the background satellite network system do not have a mechanism for independently defining IP addresses to allow independent assignment of IP addresses that may be the same, if multiple users each want some equipment to have the same IP address.

Moreover, this conventional system must coordinate with customer to make changes to remotes because the system does not provide a mechanism for network operators to easily make changes themselves without remote user involvement.

In addition, because configuration changes are made one remote at a time, configuration changes are time consuming and may disadvantageously take a long time to complete.

SUMMARY OF THE INVENTION

Accordingly, one object of the invention is to provide a novel scalable communication system, method, computer program product, and apparatuses. An embodiment of the communication system, method, computer program product, and apparatus includes common equipment shared between multiple independently administered networks. The common equipment is reconfigurable and expandable and provides changed communication capacity and functions when additional elements are added or reconfigured. Configurable features include, for example, communication bandwidth, Quality of Service, and a number of communication satellites included in the communication system. The common equipment includes expandable elements including, for example, a single hub modem chassis that can expand to communicate with more than one communication satellite and a protocol processor that can share a protocol processing task with another protocol processors.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9C is a block diagram of a protocol processor to an embodiment of the present invention;

FIG. 12 is a table of configuration states according to an embodiment of the present invention;

FIG. 18 is a flow diagram of a background method of managing a communication system.

DESCRIPTION OF THE PREFERRED EMBODIMENTS

Figure 1:
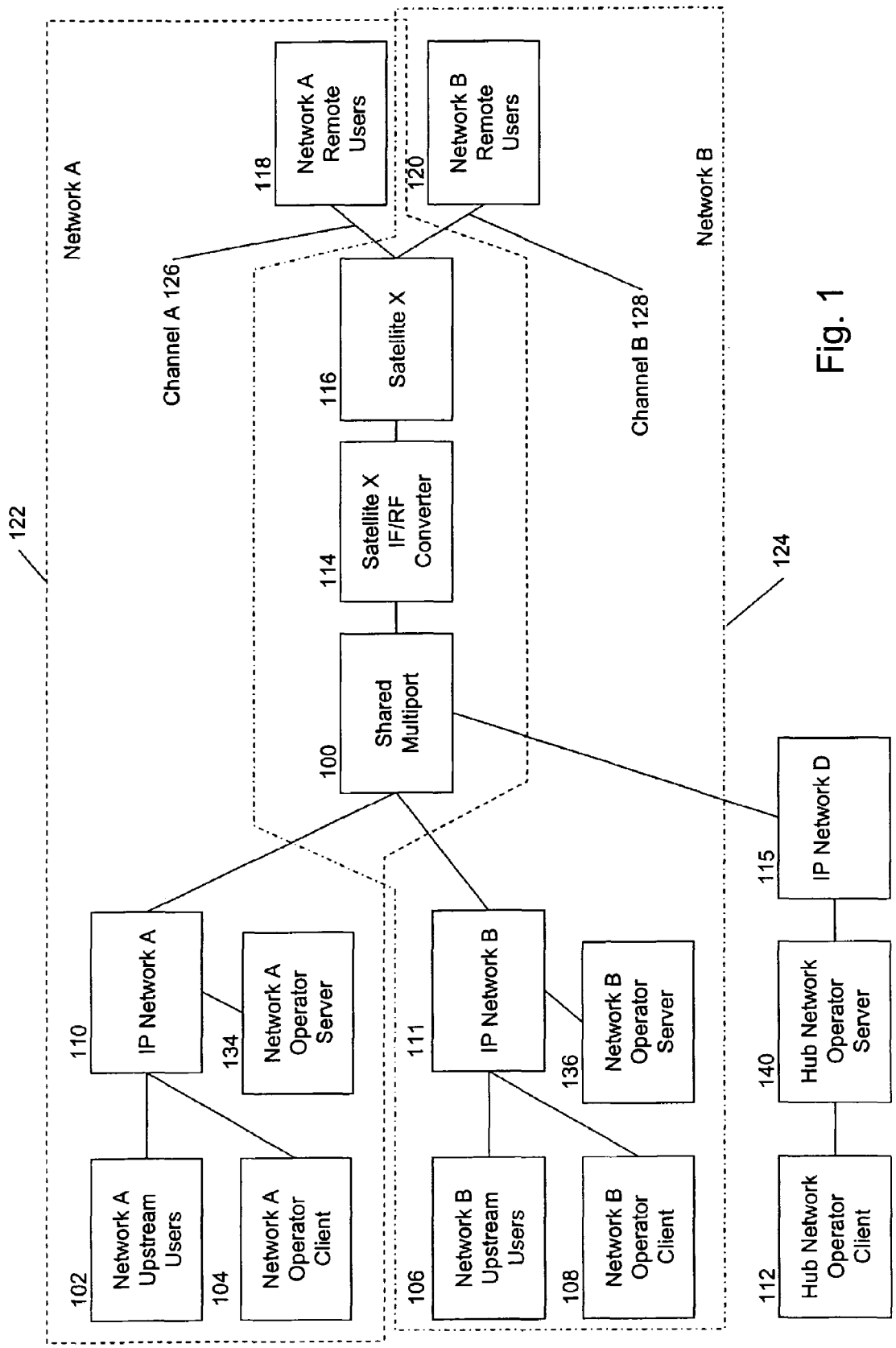
FIG. 1 is a block diagram of a communication system according to an embodiment of present invention.

Referring now to the drawings, wherein like reference numerals designate identical or corresponding parts throughout the several views, FIG. 1 shows an example of a satellite communication system including shared independently administered satellite communication networks according to an embodiment of the present invention. In particular, FIG. 1 shows an example of two shared independently administered satellite communication networks, network A 122 and network B 124. Further, it should be noted that although the description herein includes examples of satellite communication networks, the inventions also pertains to and includes communication networks that do not include satellites.

Network A 122 includes network A upstream users 102 and network A operator 104 connected by IP network 110 to a shared multiport 100. Network A operator 104 provides management functions for network A, as discussed later in this specification. Further, network A 122 includes satellite X IF/RF converter 114 providing an IF connection to the shared multiport 100 and an RF connection to a satellite X 116 also forming part of network A. The network connection between the satellite X IF/RF converter 114 and satellite X 116 includes a satellite antenna and other satellite related equipment (not shown). Further, network A 122 includes network A remote users 118, which may include a plurality of remote user sites within a communication range of satellite X. Satellite X 116 communicates with network A remote users using channel A 122. Network A remote users 118 send and receive data with each other and with the network A upstream users 102 via the aforementioned elements of network A 122.

In addition, according to the example in FIG. 1, network B 124 includes network B upstream users 106 and network B operator 108 connected by an IP network 110 to the shared multiport 100. Further, network B 124 includes satellite X IF/RF converter 114 providing a connection between the shared multiport 100 and the satellite X 116 also forming part of network B, via a satellite antenna (not shown). Further, network B 124 includes network B remote users 120 that are within a communication range of satellite X 116 using channel B 128, and network B remote users communicate with each other and with the network B upstream users 106 via the aforementioned elements of network B 124.

Thus, as can be seen in the example of FIG. 1, network A 122 and network B 124 include independent (i.e., not shared) network A upstream users 102 and network B upstream users 106, as well as independent remote users including network A remote users 118 and network B remote users 120. However, network A 122 and network B 124 share a common shared multiport 100, satellite X IF/RF converter 114 and satellite X 116. Further, in the example of FIG. 1, each shared independently administered network has an independent network operator (i.e., network A operator 104 and network B operator 108) providing network administration functions, described later in the present specification.

Further, a satellite communication system according to the present embodiment includes a hub network operator 112 that provides administration functions for the entire satellite communication system, including network A and network B, and which also allocates resources amongst the shared independently administered networks, as described later in the specification.

In addition, although the present embodiment shows a single hub network operator 112, other embodiments according to the present invention include a different number of hub network operators, to provide hub network operator functionality at different physical locations, or to provide visibility into network resources for a System Network Provider (SNP), for example, as discussed below in conjunction with the detailed description of the network management system embodiments.

Upstream users, like network A upstream user 102 in the embodiment of FIG. 1, may be any network user providing business services to the respective remote users of that network. Further, remote users may be any network user that uses network services provided by the network upstream user, or by other remote users. For example, a network upstream user may be a corporate headquarters, and field offices plus employee workstations at field offices may be examples of remote users. Alternatively, the network upstream user may represent a connection to another network, for example the global internet, and remote users may be any internet user on that internet connection. Other network upstream users may include, for example, fixed upstream headquarters with remote mobile platforms or remote sensors as remote users.

Figure 2:
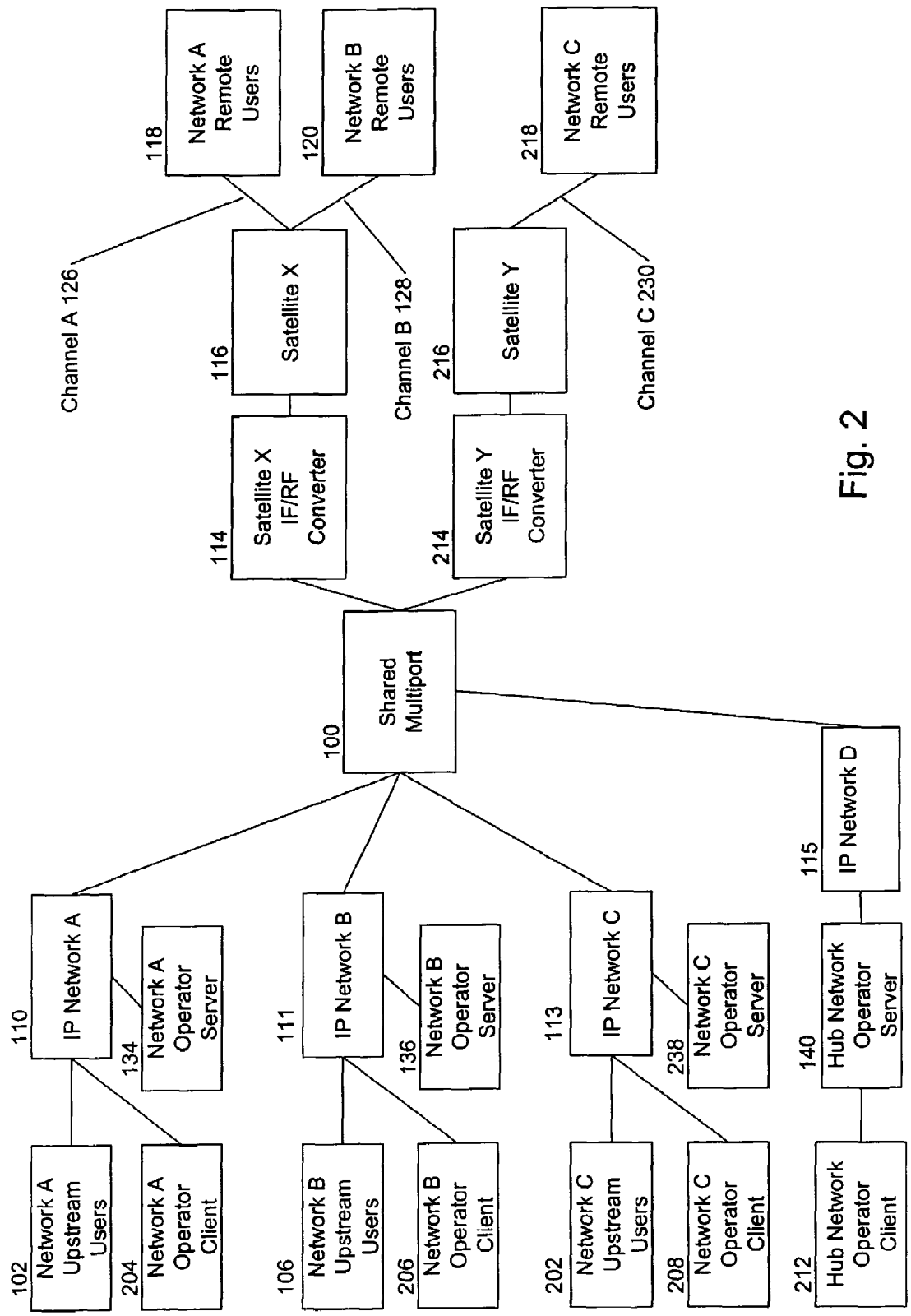
FIG. 2 is a block diagram of a communication system according to another embodiment of the present invention.

FIG. 2 includes an example of a further possible embodiment of the present invention including three shared independently administered networks A, B, and C (not individually labeled). As in the embodiment of FIG. 1, networks A and B are configured to share the shared multiport 100, the satellite X IF/RF converter 116, and satellite X 116. However, in the present embodiment, an additional network, network C also shares the shared multiport 100, and the shared multiport 100 provides connections to a second satellite IF/RF converter, satellite X IF/RF converter 214. Thus, network C includes network C upstream user 202, and network C operator 204 connected through respective IP networks 110 to the shared multiport 100. Further, network C includes satellite Y IF/RF converter 214 that provides a connection between the shared multiport 100 and satellite Y 216. Further, network C includes network C remote users 218 that are in communication with satellite Y 216 on channel C 230. Network C remote users 218 use the shared and dedicated network equipment to communicate amongst themselves and with network C upstream users 202.

Thus, as in the embodiment of FIG. 1, each shared independently administered communication network in the embodiment of FIG. 2 includes independent users, which may have independent IP spaces. In other words, none of network A upstream user 102, network B upstream user 106, network C upstream user 202, network A remote users 118, network B remote users 120, and network C remote users 218 are shared between more than one network (i.e., each user operates with a single network). However, each shared network shares the shared multiport 100, and in the present embodiment, the shared multiport 100 provides a connection to more than one satellite IF/RF converter, satellite X IF/RF converter 114 and satellite Y IF/RF converter 214. Further, network A and network B share satellite X IF/RF converter 114 and satellite X 116, while network C includes satellite Y IF/RF converter 214 and satellite Y 216.

Further, in the example of FIG. 2, each shared independently administered network has an independent network operator that is implemented using a client/server architecture, and in the present embodiment, three networks A, B, and C are implemented, each having a separate network operator. Thus, network A operator is implemented as network A operator client 204 and network A operator server 134, network B operator is implemented as network B operator client 206 and network B operator server 136, network C operator is implemented as network C operator client 208 and network C operator server 238. Further, each of the networks are connected using separate IP networks, IP network A 110, IP network B 111, and IP network C 113. Further, a satellite communication system according to the present embodiment includes a hub network operator 212 that provides administration functions for the entire satellite communication system, including networks A, B, and C, and which also allocates resources amongst the shared independently administered networks A, B, and C.

Thus, according to the present invention, a single shared multiport may provide network connections to a plurality of satellite IF/RF converters and satellites as part of a satellite communications system including a plurality of shared independently administered networks. In addition, a plurality of shared independently administered communication networks may share the shared multiport 100.

In addition, although it was not specifically indicated above, the present embodiment includes various satellites operating in various frequency ranges. For example, each of satellite X and satellite Y may include a Ku band satellite, a Ka band satellite, or a C band satellite. Further, there is no restriction on the types of satellites that may operate from a single shared multiport.

Figure 3:
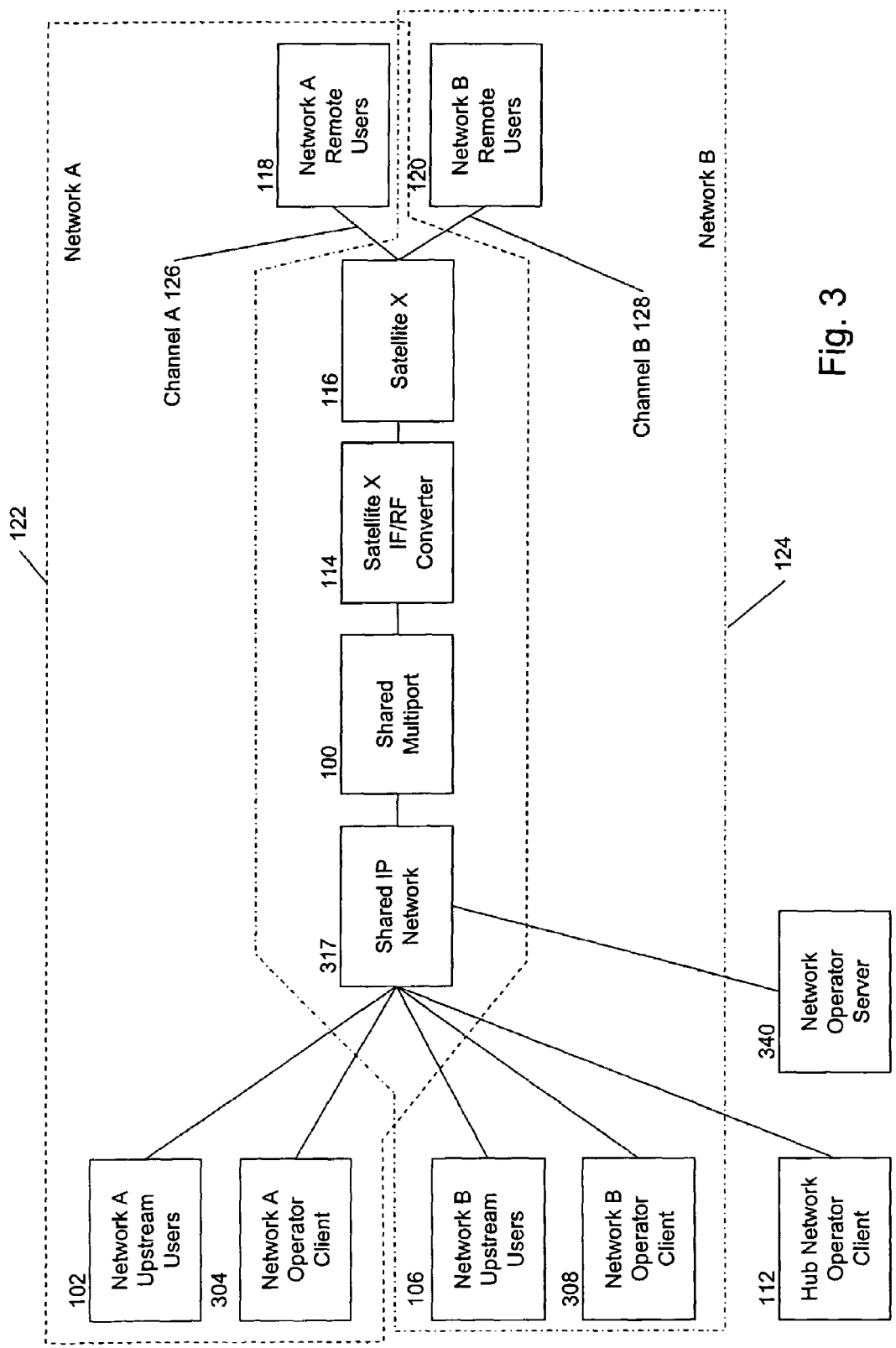
FIG. 3 is a block diagram of a communication system according to another embodiment of the present invention.

Although FIGS. 1 and 2 show independent IP networks 110 providing connections between each upstream network user/network operator and the shared multiport 100, the present invention also includes sharing IP networks 110 between two or more networks, for example as shown in FIG. 3.

FIG. 3 shows a further embodiment of a satellite communication system including shared independently administered communication networks A and B, configured as in FIG. 1. In addition, each of the upstream users and network managers share a single IP network, shared IP network 117. Further, though each network includes a separate network operator client application in the present embodiment (i.e., network A operator client 304 and network B operator client 308), they share a common network operator server 340.

Figure 4:
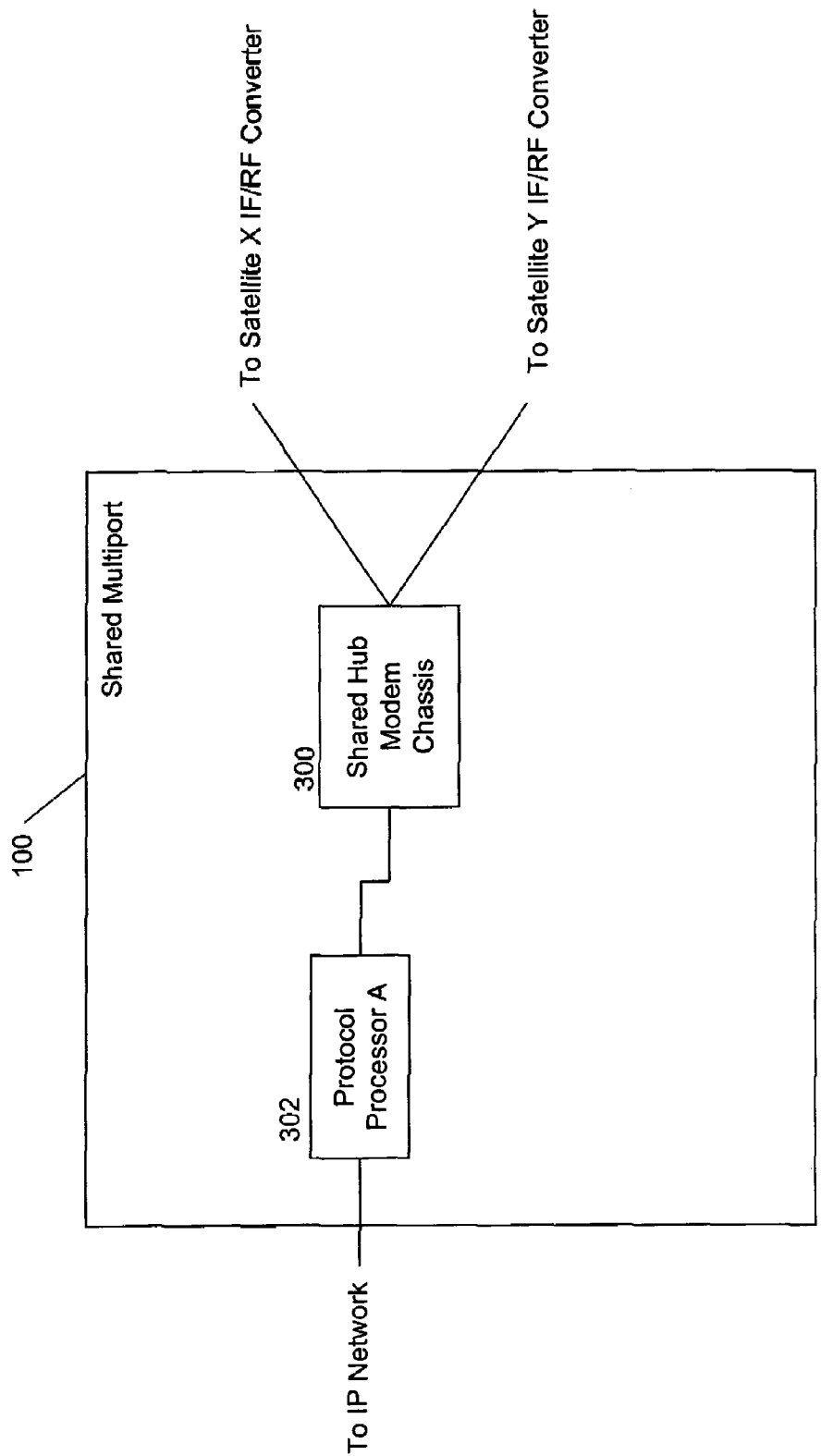
FIG. 4 is a block diagram of a shared multiport according to an embodiment of the present invention.

FIG. 4 shows a possible embodiment of a shared multiport 100 according to the present invention, configured for use in a satellite communication system as shown in the embodiment of FIG. 3. Shared multiport 100 includes a shared hub modem chassis 300 and protocol processor A 302. In the present embodiment, protocol processor A 302 provides network services for a single shared IP network, IP network 117. Alternatively, a protocol processor may provide network services for plural shared independently administered networks, e.g., networks A and B. Thus, in that embodiment, protocol processor A 302 is shared by networks A and B.

In particular, each protocol processor provides network services such as dynamic assignment of available inroute bandwidth (e.g., based on a fairness algorithm), IP routing to all line cards (described below), Internet Group Management Protocol (IGMP) based IP multicast support, hub side control for Transmission Control Protocol (TCP) and Web Acceleration to optimize TCP and web browsing over a satellite link, automatic adjustment of transmit power to maintain a low Bit Error Rate (BER) through the satellite link, downstream CIR, QoS and traffic prioritization, firewall functions (e.g., using Access Control Lists (ACL)), and link encryption to all or selected sites (e.g., using Triple Data Encryption Standard (3DES)), for example.

The shared hub modem chassis 300 shown in FIG. 4 provides a connection between each of the networks using the protocol processor and the corresponding satellite IF/RF converter. Thus, when part of a system configured according to the embodiment of FIG. 1, the shared hub modem chassis 300 provides a connection between protocol processor A 302 and the satellite X IF/RF converter, and between protocol processor B 304 and the satellite X IF/RF converter. Thus the shared hub modem chassis 300 is shared by networks A and B.

Figure 5A:
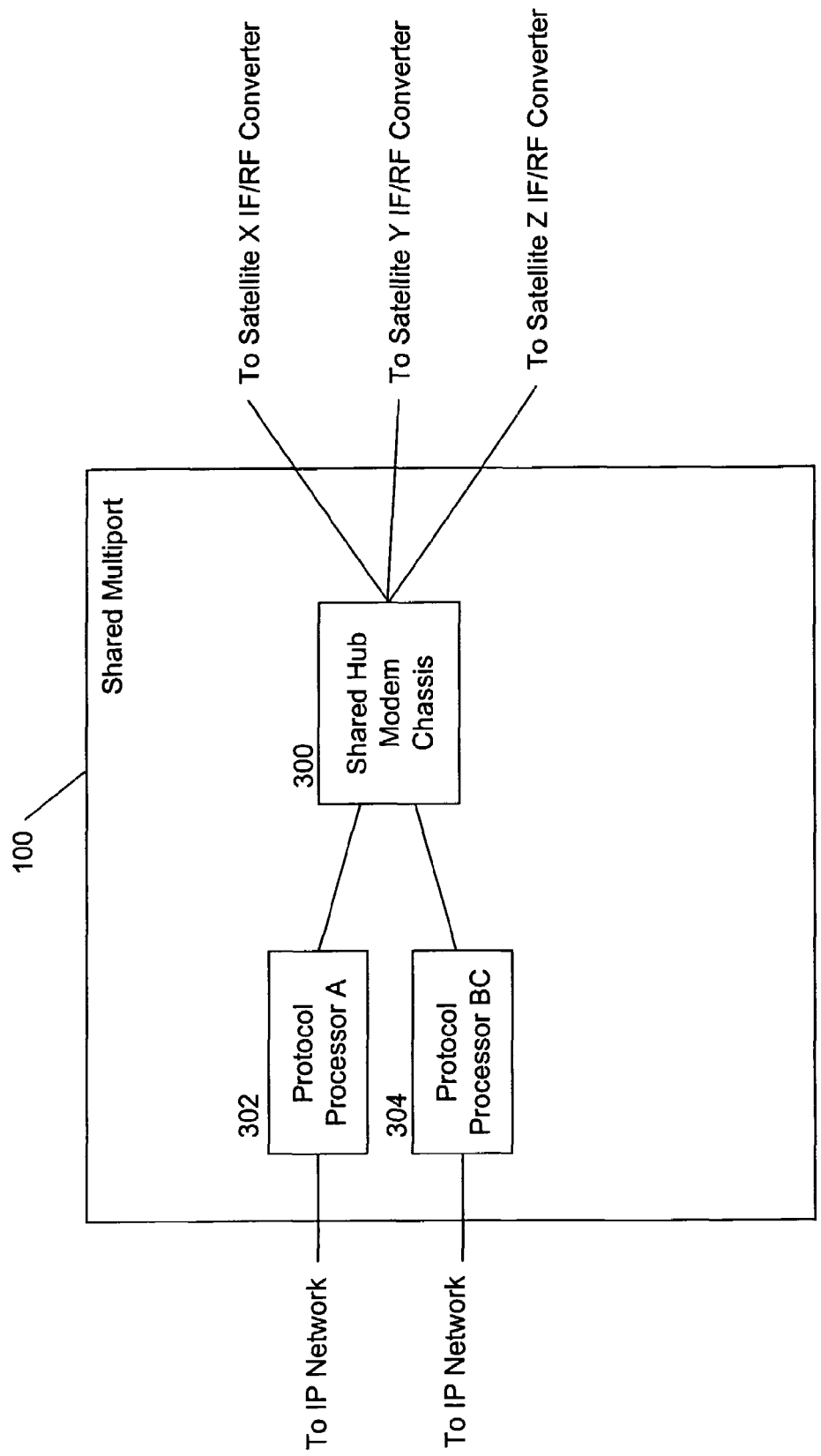
FIG. 5A is a block diagram of a shared multiport according to another embodiment of the present invention.
Figure 5B:
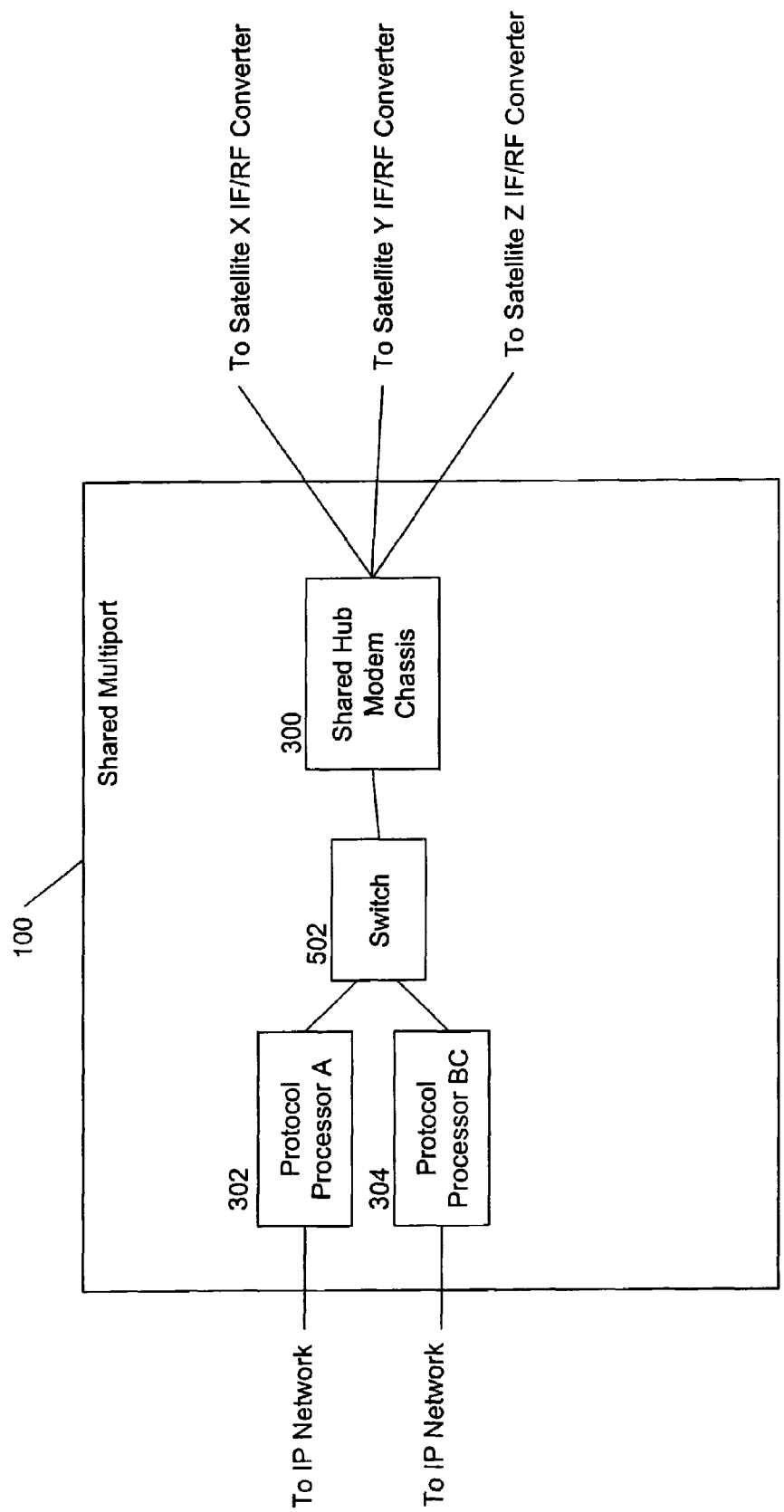
FIG. 5B is a block diagram of a shared multiport according to another embodiment of the present invention.
Figure 5C:
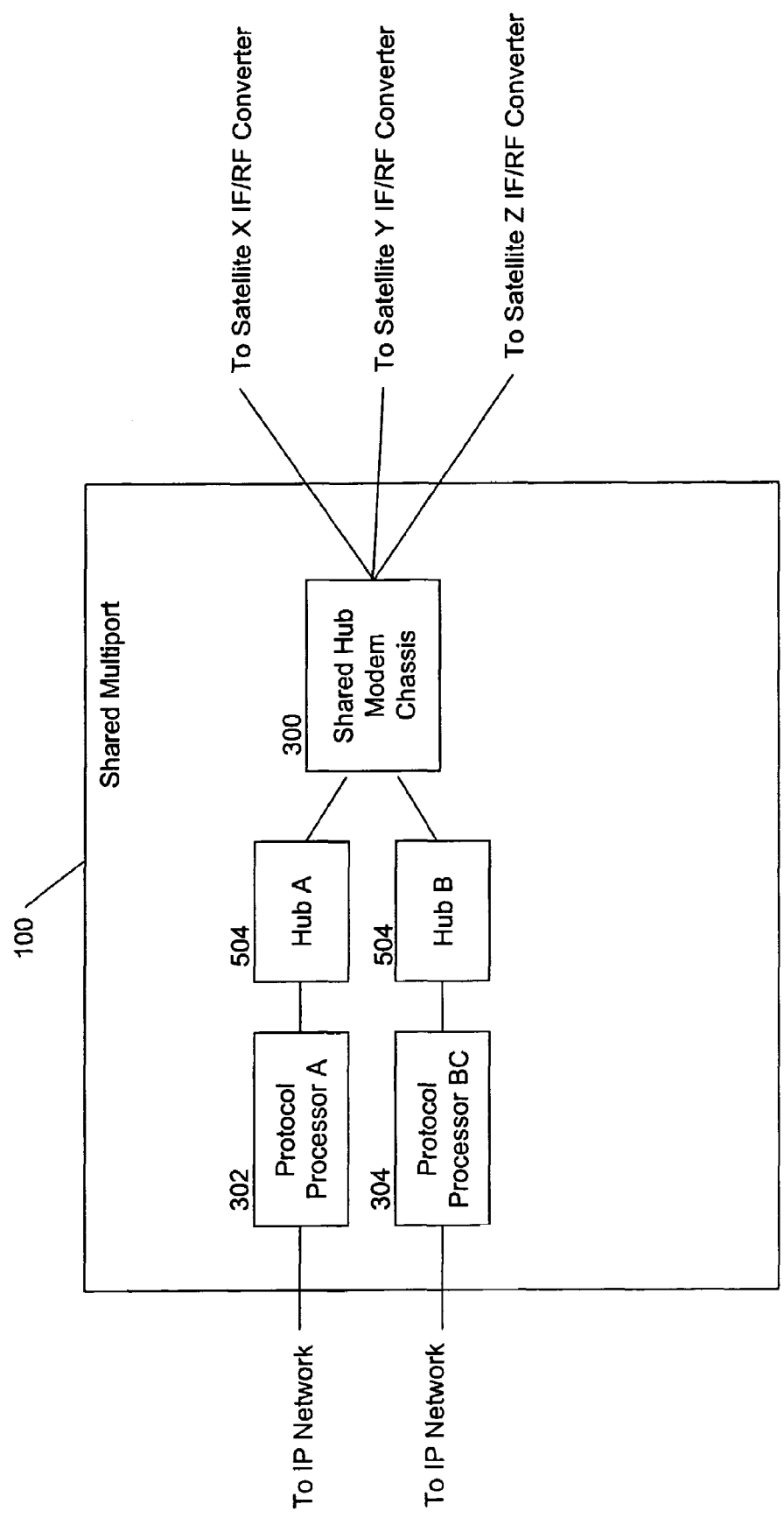
FIG. 5C is a block diagram of a shared multiport according to another embodiment of the present invention.

Although FIG. 4 shows a protocol processor connected to a single shared IP network, a protocol processor may be connected to plural networks, according to further embodiments of the present invention, for example as shown in FIGS. 5A-5C.

FIG. 5A shows a further embodiment of a shared multiport 100, according to an embodiment of the present invention. The shared multiport 100 of the present embodiment includes the shared hub modem chassis 300, the protocol processor A 302 and a protocol processor BC 304. Protocol processor A 302 is dedicated to shared network A and provides network services for shared network A. Protocol processor BC 304 is shared between network B and a third network C, and provides network services for networks B and C. Further, in the present embodiment, the shared hub modem chassis provides a connection to three satellite IF/RF converters, satellite X IF/RF converter providing satellite connections for network A, satellite Y IF/RF converter providing satellite connections for network B, and satellite Z IF/RF converter providing network connections for network C. Accordingly, in the present embodiment, the shared hub modem chassis 300 is shared by network A, network B, and network C.

FIGS. 5B and 5C show further alternative embodiments of coupling a shared hub modem chassis to a plurality of protocol processors, using a network switch 502, as in FIG. 5B or network hubs 504, as in FIG. 5C.

The protocol processor of the present invention supports a scalable system architecture. As additional users are added to the system, there is additional burden added to the protocol processor. One or more additional protocol processors can be added to the system to provide support for additional users without requiring a change to the other parts of the system. Thus, a system can be initially created to support a small number of users with a relatively small capital investment. Then, as the number of users increases, the system can be seamlessly expanded by adding additional protocol processors. In particular, when a predetermined usage threshold is reached, an additional protocol processor is added to the system. A communication processing load is automatically redistributed from the first protocol processor to the first and second protocol processors. Further, as discussed above, additional user networks can be added to the system using a single protocol processor, or additional protocol processors can be added. The system automatically redistributes the communication load over the available protocol processors. The predetermined threshold may be determined based upon a system status criteria, for example a network management system status report or a CPU utilization.

Figure 6:
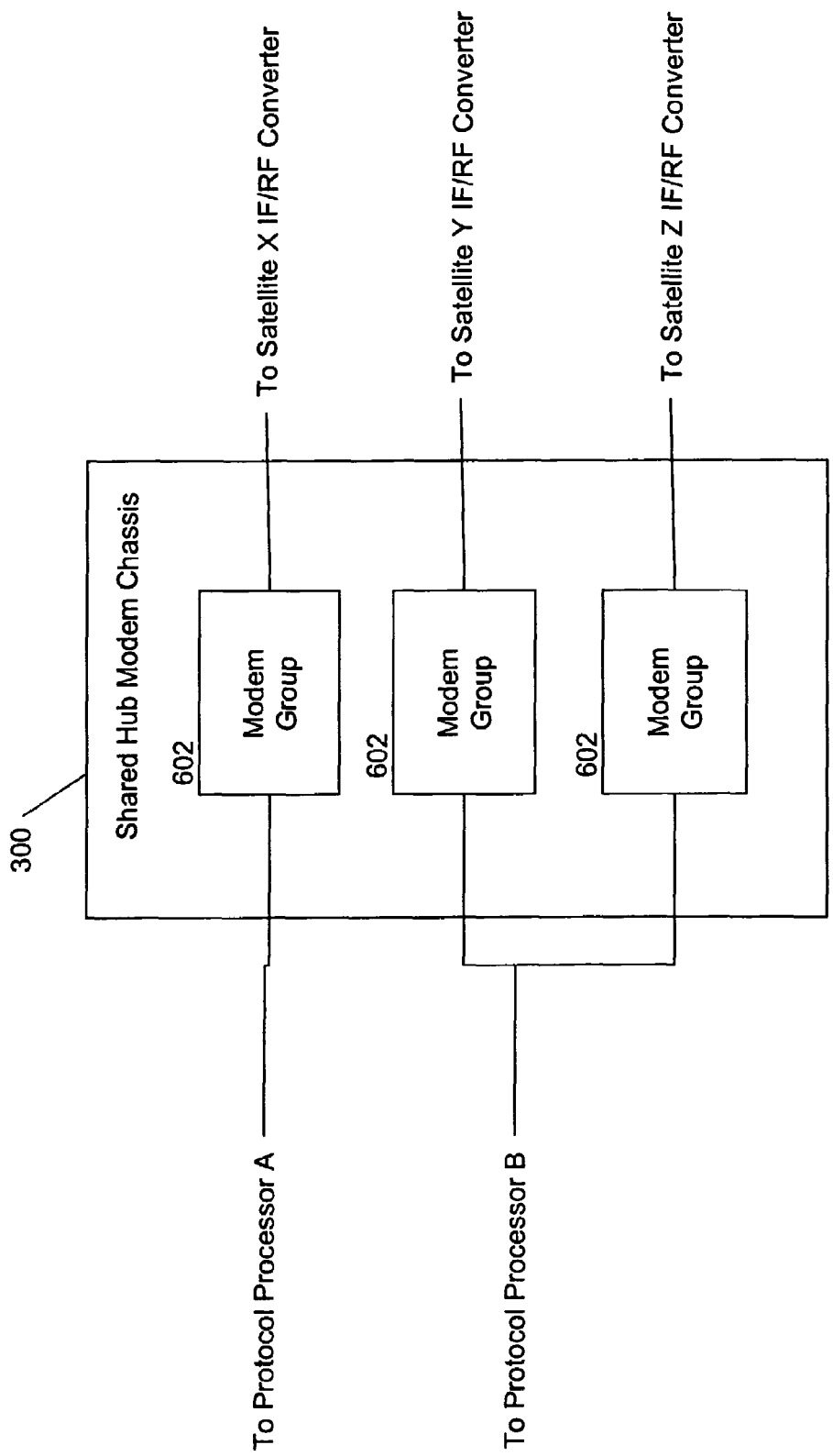
FIG. 6 is a block diagram of a shared hub modem chassis according to an embodiment of the present invention.

FIG. 6 shows a possible embodiment of shared hub modem chassis 300, according to an embodiment of the present invention and configured for use in a shared multiport as in the embodiment of FIG. 5. Shared hub modem chassis 300 includes three modem groups 602 providing connections between protocol processors and satellite IF/RF converters. In the present example, a first modem group 602 provides a connection between protocol processor A and a satellite X IF/RF converter, a second modem group 602 provides a connection between protocol processor B and a satellite Y IF/RF converter, and a third modem group 602 provides a connection between protocol processor B and a satellite Z IF/RF converter. Thus, the modem group 602 provides an interface between baseband frequency communications at the protocol processor and passband frequency communications suitable for a satellite IF/RF converter, and according to the present embodiment, each modem group is dedicated to one satellite IF/RF converter. Additionally, each modem group has a common frame time reference (i.e., synchronizing pulse for the start of each multiplexed time frame), which may be different from the common frame time reference of other modem groups. The common frame time reference implements a standard satellite communication protocol, for example as described in Pritchard, Wilbur L., and Joseph A. Scivlli, *Satellite Communication Systems Engineering*, Prentice-Hall, 1986, which is incorporated in its entirely herein by reference. Further, one protocol processor may make a connection to more than one modem group according to the present invention. In addition, although the modem groups 602 are represented with a same label, at least one modem group 602 may be differently configured or include a different embodiment of the modem group 602 than the other modem groups 602 (e.g., different types or numbers or configurations of line cards in one or each modem group 602).

Although the shared hub modem chassis embodiment in FIG. 6 includes three modem groups, other embodiments of the shared hub modem chassis are possible having a different number of modem groups. Further, since each modem group provides a connection between at least one protocol-processor and a satellite IF/RF converter connected to a satellite, other embodiments of the shared hub modem chassis are possible having connections to other numbers of satellite IF/RF converters connected to satellites. Thus, it is possible to increase or decrease the number of satellite IF/RF converters and satellites sharing a shared hub modem chassis by adding or removing, respectively, modem groups from the shared hub modem chassis.

Figure 7:
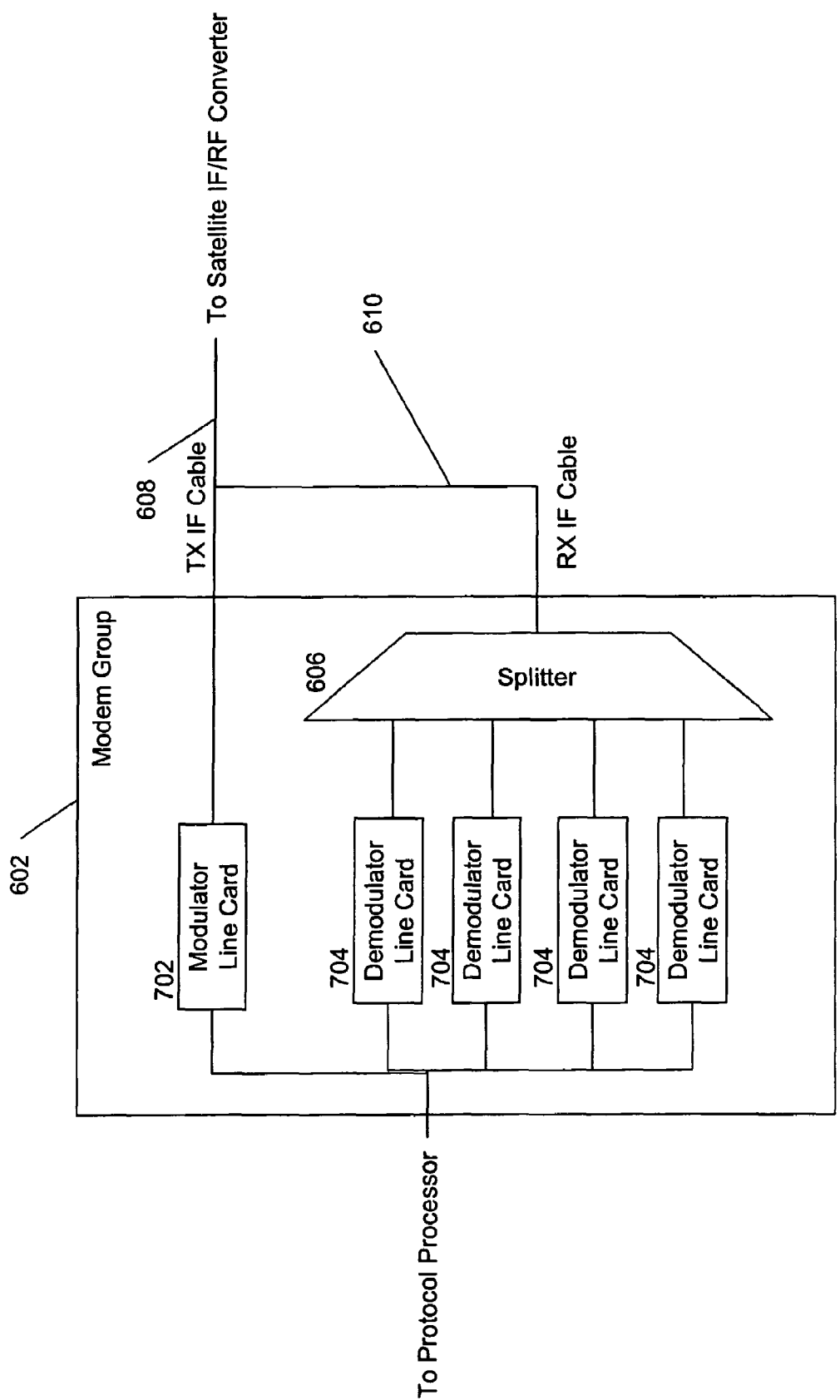
FIG. 7 is a block diagram of a modem group according to an embodiment of the present invention.

FIG. 7 shows an embodiment of a modem group 602 according to an embodiment of the present invention. The modem group 602 includes a modulator line card 702 providing a connection between a protocol processor and a TX IF Cable 608 connected to a satellite transmitter (not shown) in a satellite IF/RF converter. Additionally, each line card in a modem group shares a common frame time reference. A modulator line card accepts packets from a protocol processor (e.g., using IP over Ethernet), converts them to a serial stream (e.g., delimited HDLC frames), converts data to modulated symbols (e.g., QPSK) through a mapping process and upconverts the symbols to IF. A demodulator line card performs similar functions in a reverse order. The modem group 602 of the present embodiment also includes four demodulator line cards 704 connected to a splitter 606. The splitter 606 is also connected to an RX IF Cable 610 connected to a satellite receiver (not shown) in a satellite IF/RF converter. The splitter 606 receives satellite communications from the satellite IF/RF converter and distributes the multiplexed data in the satellite communications for use by the individual demodulator line cards 704. The demodulator line cards 704 demodulate the received communication data and provide that data to the protocol processor.

Each demodulator line card 704 provides a communication demodulation capability for remote users operating at a particular data rate. Thus, demodulation capability can be expanded or reduced by adding or removing, respectively, demodulator line cards from a modem group.

Although the embodiment of FIG. 7 shows a modem group connected to a single protocol processor, the modem group may also be connected to a plurality of protocol processors. Further, other modem group embodiments are possible including a number of demodulator line cards 704 other than shown here. In addition, although modulator line card 702 is differently designated than each demodulator line card 604, a modem group embodiment including modulator/demodulator line cards that perform the functions of both modulator line card 702 and demodulator line card 704 are possible. Thus, each line card includes the ability to both transmit a downstream carrier and receive an upstream carrier. Further, although splitter 606 is represented as being separate from the demodulator line cards 704, it is possible for the function performed by the splitter 606 to be implemented within each demodulator line card, and therefore shared between the demodulator line cards 704.

Figure 8:
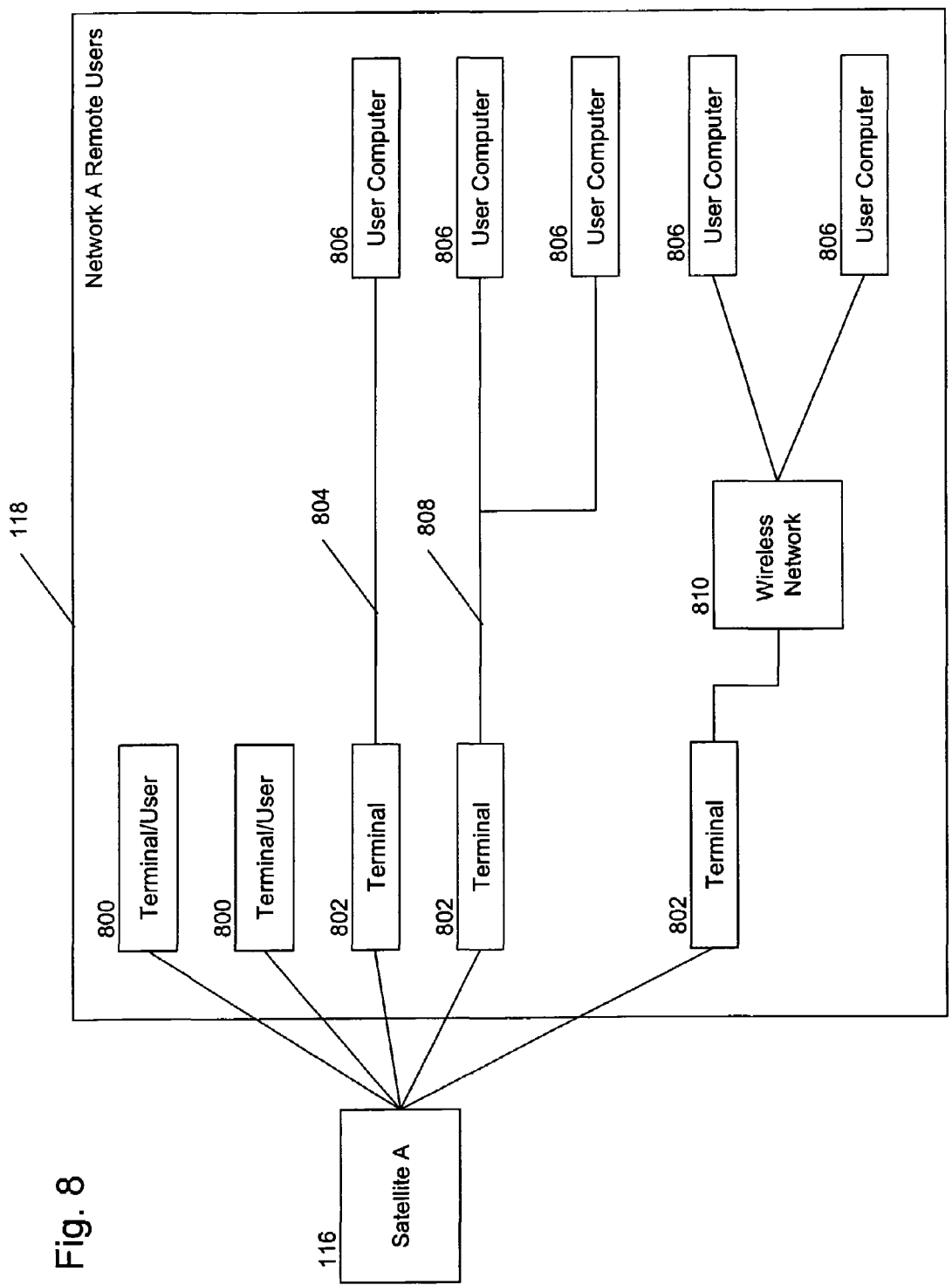
FIG. 8 is a block diagram of remote users and remote user connections according to an embodiment of the present invention.

FIG. 8 shows a possible embodiment of network A remote users 118 including two remote terminals/users 800 and three terminals 802 in communication with satellite A 116. Other quantities of terminals 802 and terminals/users 800 are also possible. Each terminal 802 includes a satellite antenna, and satellite IF/RF conversion functions, for example as in a Very Small Aperature Terminal (VSAT). Each user computer provides communication capabilities appropriate to the type of communication employed by the network (e.g., keyboard and terminal, or sensor and telemetry device). Further, the remote users 118 may include one or more remote site/users 800 that include all the features of terminal 802 and user computer 806.

Network A remote users 118 according to this embodiment also include a plurality of user computers 806 connected via communication connections to associated terminals 802. For example, a user computer 806 may communicate with a terminal 802 using a dedicated communication link 804, which provides a special purpose-point-to-point line between the terminal 802 and a user computer 806. Examples of a dedicated communication link 804 include a RS-232 data link or other point to point communication links. Alternatively, a plurality of user computers 806 may communicate with network A via a single terminal 802 using a multidrop communication link 808. Multidrop communication link 808 may include, for example, an RS-422 data link or an Ethernet data link. Further, a plurality of user computers 806 may communicate with network A via a single terminal 802 using a wireless communication link 810. A wireless communication link 810 may be implemented using a radio network, like WiFi or WiMax, an optical network, microwave links, or other wireless communication links.

This arrangement of remote users advantageously allows one or a plurality of user computers to connect to a shared independently managed network using a remote site, and further allows those user computers to be advantageously remotely located from the remote site. For example, with a WiMax wireless communication link, a plurality of user computers can share a common VSAT terminal 802 within a region of a few kilometers.

Figure 9A:
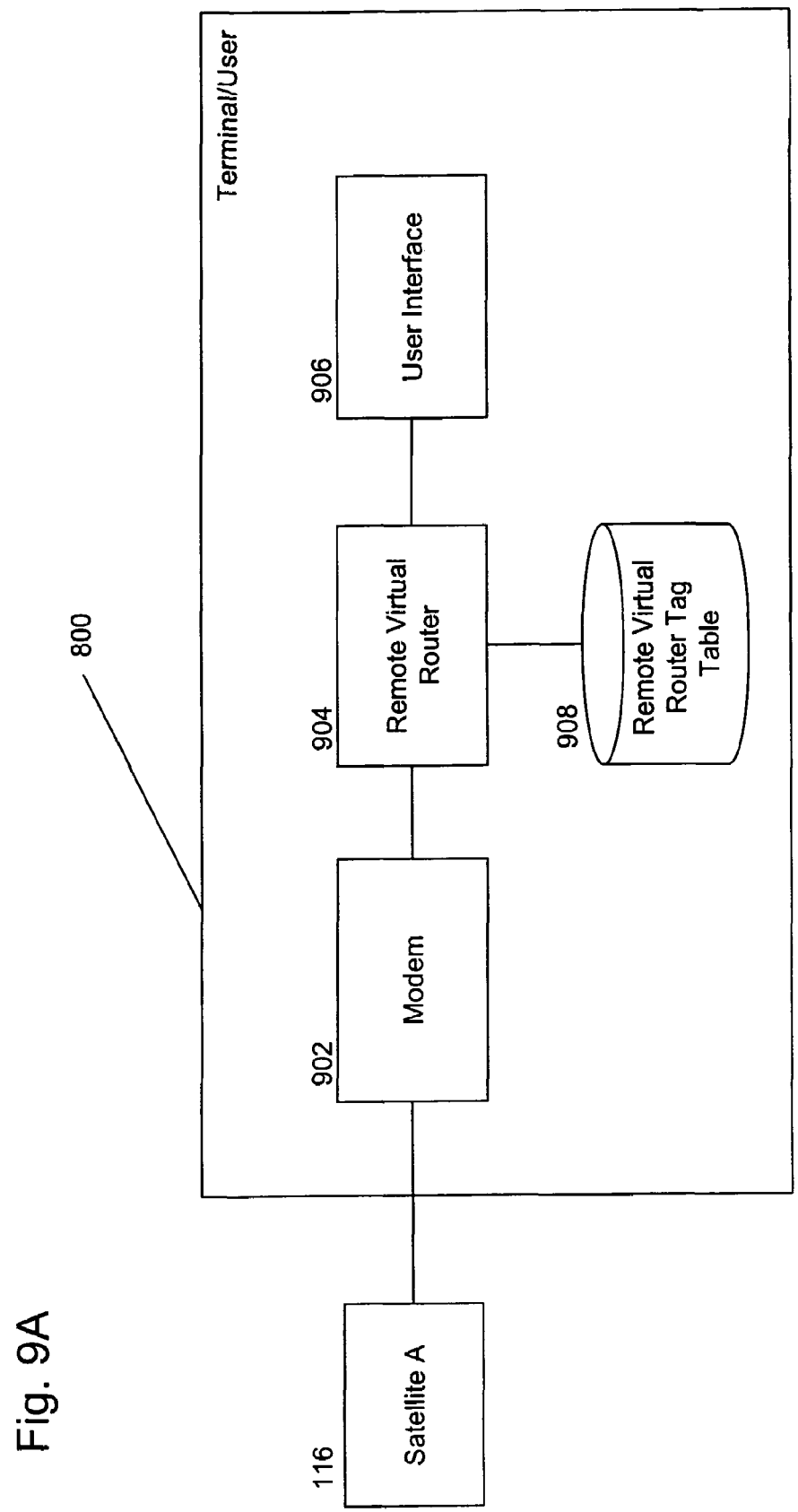
FIG. 9A is a block diagram of a terminal/user according to an embodiment of the present invention.
Figure 9B:
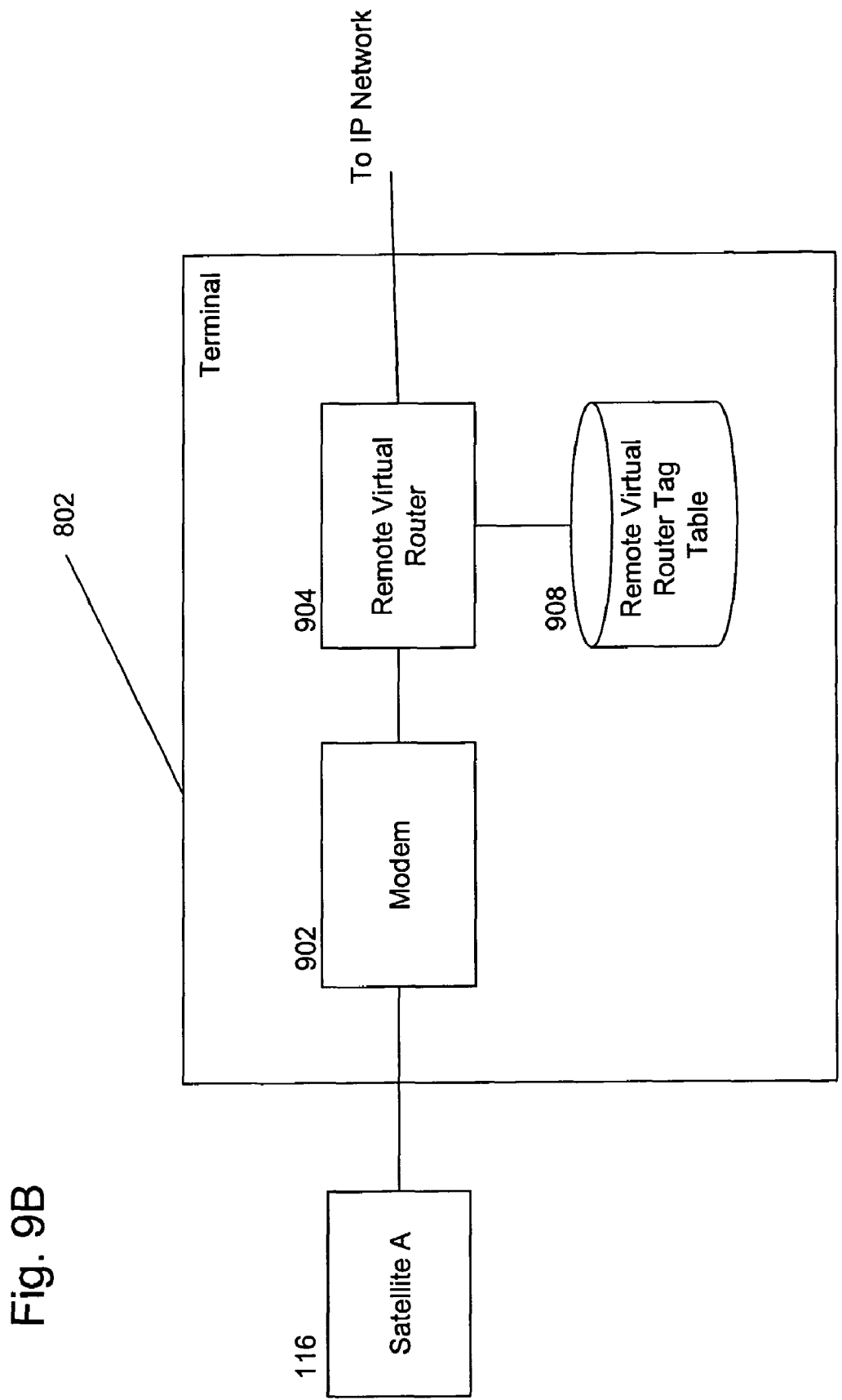
FIG. 9B is a block diagram of a terminal according to an embodiment of the present invention.

FIGS. 9A and 9B include detailed block diagrams of a possible embodiment of a remote site terminal/user 800 and single terminal 802 according to the present invention. Each single terminal 802 includes a satellite modem 902, a remote virtual router 904 and a remote virtual router tag table 908. Each terminal/user 800 includes a satellite modem 902, a remote virtual router 904, a remote virtual router tag table 908 and user interface 906. The remote virtual router 904 and remote virtual router tag table 908 work with the upstream virtual router 910 and upstream virtual router tag table 914 (described below) in conjunction with the shared network equipment, to provide a virtual router capability.

As discussed above, each remote terminal transmits communications from remote users to upstream users using the shared network equipment and each remote terminal receives communications from upstream users sent via the shared network equipment. The remote virtual router 904 appends a virtual router tag (not shown) based on the contents of the remote virtual router tag table 908 to each communication packet that is intended to be transmitted to an upstream user. The virtual router tag includes a unique identifier that is mapped to a local IP address of a remote user or an upstream user, and the mapping between the virtual router tag and each local IP address is stored in the remote virtual router tag table 908. A duplicate copy of the mapping is also stored in the upstream virtual router tag table 914 (discussed below). Further, the remote virtual router removes a virtual router tag from each communication packet transmitted to a remote user and routes the packet to the local IP address of a remote user, based on the contents of the remote virtual router tag table 908.

FIG. 9C is a detailed block diagram of protocol processor 302, which includes upstream virtual router 910 operatively connected to upstream virtual router tag table 914 and protocol converter 912. The protocol converter 912 converts communications from line cards in the shared hub modem chassis for transmission to a client on the IP network and converts communications from a client on the IP network for transmission to a line card in the shared hub modem chassis. The upstream virtual router 910 appends a virtual router tag (not shown) based on the contents of the upstream virtual router tag table 914 to each communication packet that is intended to be transmitted to a remote user on a particular VLAN. The virtual router tag includes a unique identifier that is mapped to a local IP address of a remote user or an upstream user, and the mapping between the virtual router tag and each local IP address is stored in the upstream virtual router tag table 914. Further, the upstream virtual router 910 removes a virtual router tag from each packet to be transmitted to an upstream user and routes the packet to the local IP address of the upstream user based on the contents of the upstream virtual router tag table 914.

Thus, communications between the protocol processor and a remote terminal according to an embodiment of the present invention includes a virtual router capability that repackages IP packets into virtual router packets by adding a virtual router tag. Each intermediate system element, including the shared hub modem chassis, satellite IF/RF converter and satellite, is configured to pass the virtual router packets along. At the protocol processor end, virtual router packets are converted back to IP packets by consulting a virtual router lookup table that maps the combined virtual router address and IP address back into an IP address. Similarly, at the remote end, downstream virtual router packets are converted back to IP packets using the virtual router table.

This arrangement allows complete freedom in the administration of networks that share hardware. Thus, a first shared network operator may select and assign IP addresses for first shared network users without regard to or knowledge of any IP addresses selected by a second network operator for second network users. For example, network operator A may assign a network A remote user the IP address 10.0.0.1 and network operator B may also assign a network B remote user the same IP address, 10.0.0.1, without any risk of conflict.

Further, a capability of a communication system can be flexibly varied at least by 1) changing a number of modem groups, 2) changing a number of enabled line cards, 3) changing a number of communicating satellites, or 4) changing a number of protocol processors. In particular, the system may be created with a relatively small capital investment, but may be expanded without adding a new hub modem chassis.

First, the system communication capability may be changed by changing a number of modem groups. As discussed above, each modem group provides a potentially unique independently administered network capability to the communication system. Each network may be differently configured to satisfy different technical or business purposes. For example, each network may support a different encryption scheme (e.g., having different encryption levels on one network than on other networks in the communication system), different communication purposes (e.g., voice priority communication on one network and data priority communication on another network in the communication system), different QoS scheme (e.g., different QoS levels on one network than on other networks in the communication system), different bandwidth allocation schemes and different owners or system administrators on each network. A number of modem groups may be reduced by reallocating line cards of an existing modem group to one or more other modem groups in the hub modem chassis. Alternatively, a modem group may be added to the system by reallocating line cards of existing modem groups or by adding new line cards and allocating them to a new modem group. Thus, additional independently administered networks may be added to the communication system without adding an additional hub modem chassis.

Second, a total upstream communication bandwidth of a particular modem group may be changed by allocating additional line cards to that modem group, or by de-allocating line cards. For example, when the desired bandwidth exceeds a predetermined threshold, one or more additional line cards are enabled for a modem group and communications are redistributed over all the line cards in the enlarged modem group to allow the communication system to provide increased bandwidth without adding an additional hub modem chassis. The predetermined threshold may be determined based upon a system status criteria, for example a network management system status report or a CPU utilization.

Third, the communication system may be expanded to support new users or to allocate communication resources to a particular group of existing users. For example, the communication system may be expanded to support new users in a new geographic region by adding an additional satellite capability including a communication link to an additional satellite. The additional satellite capability is added to the existing system by adding or allocating one or more new modem groups in the shared hub modem chassis and connecting the new modem group to an additional satellite via an IF/RF converter, as discussed above. Thus, a new satellite capability allowing communication with a new group of users using an additional satellite is easily added to the communication system without adding an additional hub modem chassis.

Fourth, a communication capability of the communication system may be expanded to include additional protocol processing capability by adding additional protocol processors. For example, if a desired level of protocol processing capability increases beyond a particular threshold, additional protocol processors may be enabled, and the protocol processing capability is shared between plural protocol processors. For example, an increase in voice communication capacity requires an increased protocol processing. Thus, if a desired a voice communication capacity exceeds a predetermined threshold, an additional protocol processor may be enabled to increase the protocol processing capability of the communication system.

Figure 10:
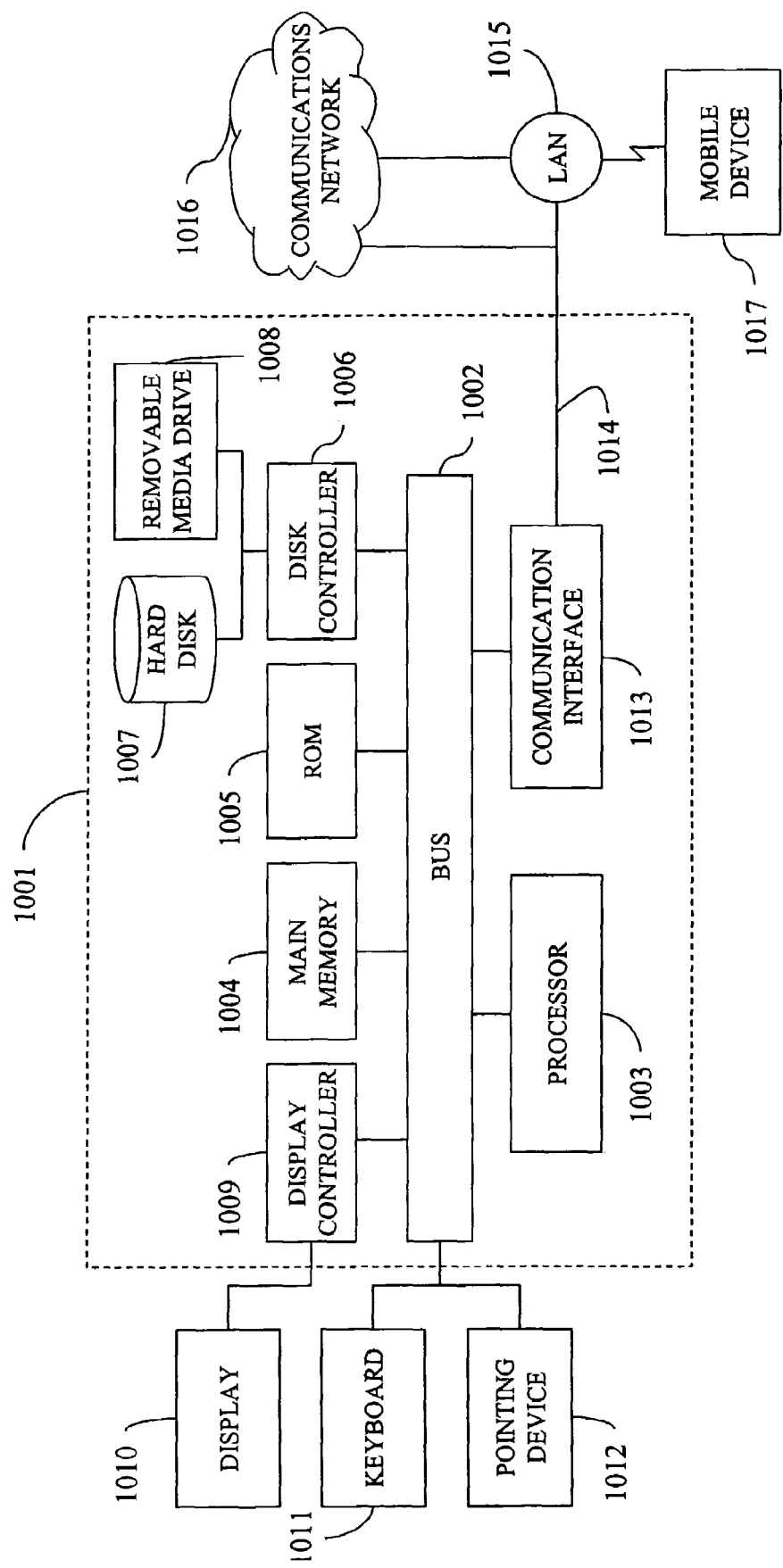
FIG. 10 is a block diagram of a computer used in an embodiment of the present invention.

FIG. 10 illustrates a computer system 1001 upon which an embodiment of the present invention may be implemented. The computer system 1001 includes a bus 1002 or other communication mechanism for communicating information, and a processor 1003 coupled with the bus 1002 for processing the information. The computer system 1001 also includes a main memory 1004, such as a random access memory (RAM) or other dynamic storage device (e.g., dynamic RAM (DRAM), static RAM (SRAM), and synchronous DRAM (SDRAM)), coupled to the bus 1002 for storing information and instructions to be executed by processor 1003. In addition, the main memory 1004 may be used for storing temporary variables or other intermediate information during the execution of instructions by the processor 1003. The computer system 1001 further includes a read only memory (ROM) 1005 or other static storage device (e.g., programmable ROM (PROM), erasable PROM (EPROM), and electrically erasable PROM (EEPROM)) coupled to the bus 1002 for storing static information and instructions for the processor 1003.

The computer system 1001 also includes a disk controller 1006 coupled to the bus 1002 to control one or more storage devices for storing information and instructions, such as a magnetic hard disk 1007, and a removable media drive 1008 (e.g., floppy disk drive, read-only compact disc drive, read/write compact disc drive, compact disc jukebox, tape drive, flash memory drive, and removable magneto-optical drive). The storage devices may be added to the computer system 1001 using an appropriate device interface (e.g., small computer system interface (SCSI), integrated device electronics (IDE), enhanced-IDE (E-IDE), direct memory access (DMA), or ultra-DMA).

The computer system 1001 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1001 may also include a display controller 1009 coupled to the bus 1002 to control a display 1010, such as a cathode ray tube (CRT), for displaying information to a computer user. The computer system includes input devices, such as a keyboard 1011 and a pointing device 1012, for interacting with a computer user and providing information to the processor 1003. The pointing device 1012, for example, may be a mouse, a trackball, or a pointing stick for communicating direction information and command selections to the processor 1003 and for controlling cursor movement on the display 1010. In addition, a printer may provide printed listings of data stored and/or generated by the computer system 1001.

The computer system 1001 performs a portion or all of the processing steps of the invention in response to the processor 1003 executing one or more sequences of one or more instructions contained in a memory, such as the main memory 1004. Such instructions may be read into the main memory 1004 from another computer readable medium, such as a hard disk 1007 or a removable media drive 1008. One or more processors in a multi-processing arrangement may also be employed to execute the sequences of instructions contained in main memory 1004. In alternative embodiments, hard-wired circuitry may be used in place of or in combination with software instructions. Thus, embodiments are not limited to any specific combination of hardware circuitry and software.

As stated above, the computer system 1001 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1001, for driving a device or devices for implementing the invention, and for enabling the computer system 1001 to interact with a human user (e.g., print production personnel). Such software may include, but is not limited to, device drivers, operating systems, development tools, and applications software. Such computer readable media further includes the computer program product of the present invention for performing all or a portion (e.g., locally portion of distributed processing) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed or centralized for better performance, reliability, and/or cost.

The term "computer readable medium" as used herein refers to any medium that participates in providing instructions to the processor 1003 for execution. A computer readable medium may take many forms, including but not limited to, non-volatile media, volatile media, and transmission media. Non-volatile media includes, for example, optical, magnetic disks, flash memory, and magneto-optical disks, such as the hard disk 1007 or the removable media drive 1008. Volatile media includes dynamic memory, such as the main memory 1004. Transmission media includes coaxial cables, copper wire and fiber optics, including the wires that make up the bus 1002. Transmission media also may also take the form of acoustic or light waves, such as those generated during radio wave and infrared data communications.

Various forms of computer readable media may be involved in carrying out one or more sequences of one or more instructions to processor 1003 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1001 may receive the data on the telephone line and use an infrared transmitter to convert the data to an infrared signal. An infrared detector coupled to the bus 1002 can receive the data carried in the infrared signal and place the data on the bus 1002. The bus 1002 carries the data to the main memory 1004, from which the processor 1003 retrieves and executes the instructions. The instructions received by the main memory 1004 may optionally be stored on storage device 1007 or 1008 either before or after execution by processor 1003.

The computer system 1001 also includes a communication interface 1013 coupled to the bus 1002. The communication interface 1013 provides a two-way data communication coupling to a network link 1014 that is connected to, for example, a local area network (LAN) 1015, or to another communications network 1016 such as the Internet. For example, the communication interface 1013 may be a network interface card to attach to any packet switched LAN. As another example, the communication interface 1013 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1013 sends and receives electrical, electromagnetic or optical signals that carry digital data streams representing various types of information.

The network link 1014 typically provides data communication through one or more networks to other data devices. For example, the network link 1014 may provide a connection to another computer through a local network 1015 (e.g., a LAN) or through equipment operated by a service provider, which provides communication services through a communications network 1016. The local network 1014 and the communications network 1016 use, for example, electrical, electromagnetic, or optical signals that carry digital data streams, and the associated physical layer (e.g., CAT 5 cable, coaxial cable, optical fiber, etc). The signals through the various networks and the signals on the network link 1014 and through the communication interface 1013, which carry the digital data to and from the computer system 1001 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1001 can transmit and receive data, including program code, through the network(s) 1015 and 1016, the network link 1014 and the communication interface 1013. Moreover, the network link 1014 may provide a connection through a LAN 1015 to a mobile device 1017 such as a personal digital assistant (PDA) laptop computer, or cellular telephone.

Each network operator includes a network management system (NMS) that provides network administration functionality with visibility into a level of network resources that may be differently configured. Network resources managed by the NMS include all configurable aspects of the communication system including remote user equipment, line cards, the shared hub modem chassis, and the protocol processors, for example. The NMS includes a database that stores configuration parameters and privileges for each resource in the communication system.

Each NMS may be configured as a client/server application with a client NMS application and a server NMS application. The client and server NMS applications may execute on a same computer or on different computers located in a same location or at different locations. Although the NMS server application may receive communication for each of the shared networks configured to share common hardware, as in the embodiment of FIG. 3, the NMS server application is configured to only provide network monitoring and status information to an NMS client regarding networks over which the NMS client has administrative privileges. The configuration of the NMS client may be based on a content of a database. Further, the NMS server only allows an NMS client to perform network management functions that the NMS client is privileged to perform based on the database content. In addition, the NMS server only allows an NMS client to manage the user accounts of users on a network that the NMS client is privileged to administer, based on the database content.

For each configurable resource in the communication system, the NMS stores a metadata value including a state variable representing a state of a change to the associated parameter, an original value of the configuration parameter, and a desired changed value of the configuration parameter. The NMS uses the stored metadata to coordinate a change in configuration of the communication system with minimal disruption to communication system operation. For example, one or more network configuration changes may be planned using the NMS, and the desired changed value of each configuration parameter is stored in the metadata. Then, NMS can be scheduled to make all the network configuration parameters at the same time, and at a time that is most convenient for users, for example at night time when communication system usage is low.

To implement a network configuration change, the NMS uses a coordinated three state change mechanism. In particular, in step 1, desired changes are entered in the metadata stored in the configuration database. In step 2, the NMS displays the desired changes and allows a network operator to make further changes, and in step 3 the NMS communicates the changes to the participating network resources, monitors their response and stores their status in the database metadata.

This three-step change process gives the network operator ultimate control over operational network components, because no change takes place without the operator initiating it. However, the three-step change process also creates a situation where the NMS database is temporarily out-of-sync with the actual network (i.e., after the operator has made database modifications, but before they have been applied to the network). Accordingly, to help operators easily manage this situation and others like it, each key component of the network maintains and reports a configuration state variable that shows the current status of that key component.

Figure 11:
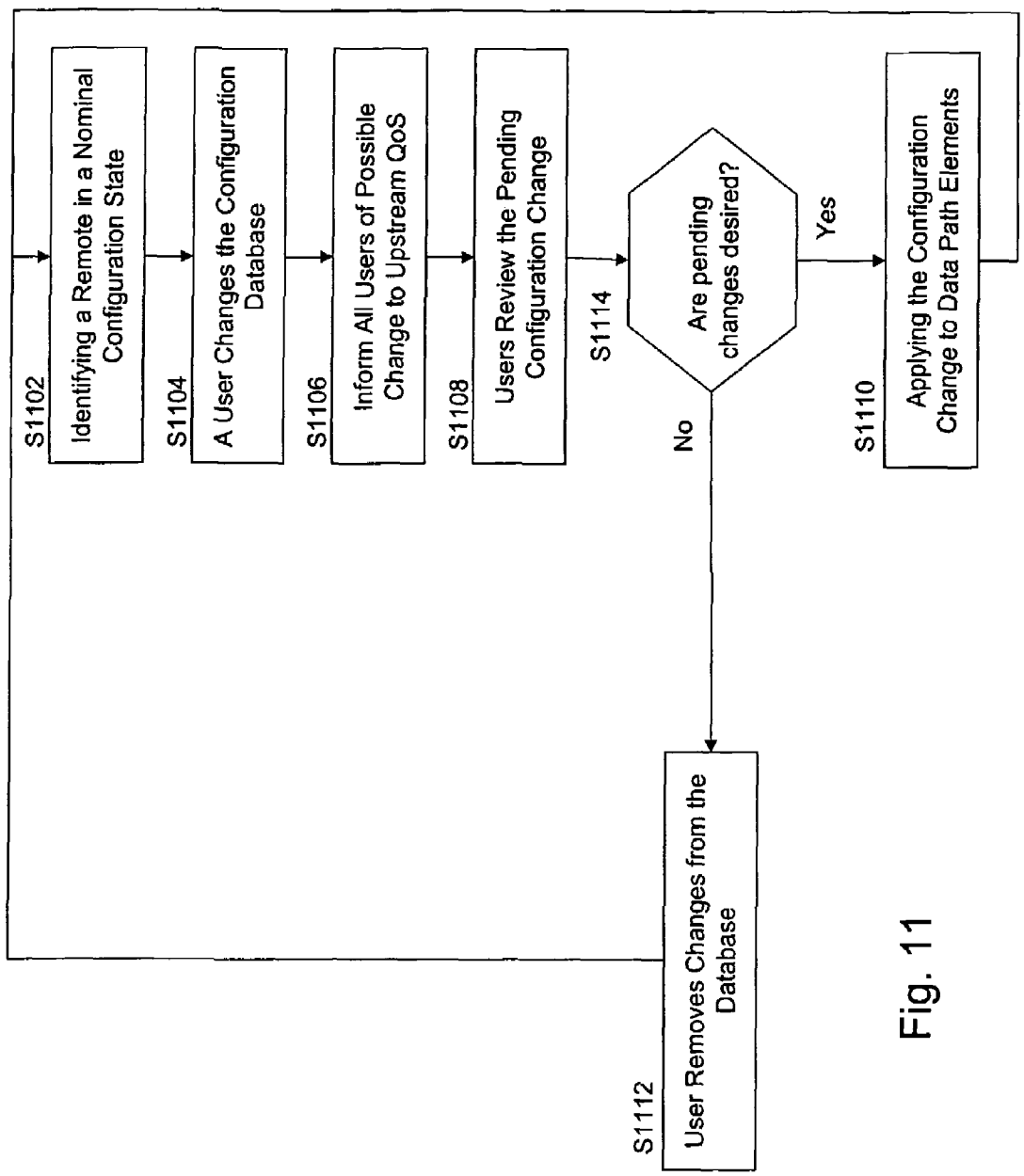
FIG. 11 is a flow diagram of a method according to an embodiment of the present invention.

FIG. 11 shows an example of a method of changing a network configuration, according to an embodiment of the present invention. In step S1102, a remote user is already configured, commissioned, and all previous changes have been applied, thus the remote user reports its configuration state as "Nominal" and the configuration state is monitored and displayed for the network operator and stored in the NMS metadata. In step S1104, a user makes some change to the configuration database, for example, the user changes a QoS parameter. In step S1106, all users are informed of possible changes to-Upstream QoS caused by the configuration database changes made in S1104. In step S1108, each user reviews the pending configuration changes and resulting changes to QoS. In step S1114, the users indicate if pending changes are desired. If the changes are desired, proceed to step S1110 in which the changes are applied to the data path elements (e.g., shared multiport, satellite IF/RF converters, remote users, etc . . . ). If the changes are not desired, proceed to step S1112, in which the user that changed the configuration database removes that change from the database.

Thus, according to the present invention, the configuration state variable is associated with each configurable element of the communication system and the configuration state value can be easily managed by the NMS thereby allowing configuration changes to be made in an orderly, predictable, and controlled manner.

In a further example of a method of making a configuration change, a hub frequency change is desired. Using the NMS, a network operator enters the desired hub frequency change and the NMS stores the hub frequency change in the metadata database. Further, the NMS makes all other related changes to configurable communication system equipment, including changes to the frequency of each remote user operating with that hub. At this point the network operator can review all changes related to the hub frequency change, including an indication of which parameters must consequently change on each related piece of communication equipment, prior to applying that change, and if necessary, the network operator can modify or abort the change.

Further, as a network operator enters configuration parameters into the NMS, the NMS displays an indication of which further configuration parameters may also be required and indicates if the configuration parameters have been fully entered.

Further, when making a configuration change, the NMS will periodically poll related communication system elements to determine their current configuration state.

Each configurable element of the communication system has a communication state, which according to one embodiment of the present invention, includes the configuration states as shown in FIG. 12.

The network management system 804 may be configured to perform a hub network operator function or a virtual network operator function. If the network management system is configured to perform the role of a hub network operator, the network operator 800 is configured for hub operator use, as in hub network operator client 112 and hub network operator server 140 of FIG. 1. If the network management system 804 is configured to perform the role of a virtual network operator, the network operator 800 is configured for network operator use, as in the network A operator client 104 and network A operator server 134, or as in network B operator client 108 and network B operator server 136 of FIG. 1. Further, the network management system is configured to provide different levels of capability for different users.

For example, one possible embodiment of the network management system (NMS) 804, provides different levels of permission and visibility to network resources depending upon the type of user. For example, a hub network operator user type identified as a Hub Network Operator (HNO) Super User has permission and visibility to all communication system resources, a network operator user type identified as a Virtual Network Operator (VNO) Super User has visibility only to resources of one shared independently administered network in the communication system, and a network operator user type identified as a VNO Guest User has read-only permission to observe configuration parameters and network status for one shared independently administered network in the communication system. The network management system 804 also includes the ability to create other user types with other permissions and visibility of network resources. Further, VNO accounts may be configured to provide access to the resources allocated to the VNO's network and may be configured to not have access to the resources allocated to other networks in the shared satellite communication system. Alternatively, remote users and communications in a network may be made part of different network subgroups, and different VNOs on the same network may be configured to have access to remote users and communications in one subgroup and may be further configured not to have access to remote users and communications in another subgroup.

VNO accounts are configured for each VNO NMS user and include user information, for example name/password, user type (e.g., VNO Super User or VNO Guest). VNO Super Users may use the network management system 804 to perform virtual network operations, for example to add, modify and delete network remote users, activate and deactivate network remote users, select Quality of Service (QoS) profiles, monitor and query remote statistics, and have visibility only to their independent shared network. VNO Super Users cannot add or modify carriers, independently add or modify line cards or protocol processors, independently add or modify hardware components, or view other shared networks in the communication system, because these features are reserved to HNO and System Network Provider (SNP) accounts due to their impact on shared RF configurations.

Participants in a method of operating a satellite communication system that includes shared independently administered satellite communication networks include a Host Network Operator, a Virtual Network Operator, a Shared Network Provider, and Users. These participants achieve their business goals through the use of a shared communications system, according to the present invention.

A Host Network Operator (HNO) provides a hosting environment for sophisticated enterprise or service provider customers who desire more control over the network management of their services. The HNO role may be performed by companies who own or operate satellites to broaden existing space segment distribution channels or to create new channels for service offerings. HNOs manage shared network equipment and allocate network resources to Virtual Network Operators (VNOs). For example, HNOs perform network management, installation and maintenance services for VNOs.

Further, HNOs are responsible for purchasing and maintaining a portion of the hardware and software in a satellite network. In particular, HNOs are responsible for satellites and satellite ground equipment, including spacecraft, transponders, hub antenna components, and hub Radio Frequency Transceivers (RFT) or radio frequency/intermediate frequency converters (IF/RF converters). HNOs are also responsible for a portion of the shared multiport equipment. At the shared multiport, HNOs are responsible for the hub modem chassis, protocol processors, host Network Management System (NMS) server, and host NMS clients.

HNOs are responsible for managing some system parameters, including inbound and outbound carriers, bandwidth regions, carrier frequencies, power, bit rates, acquisition and uplink control parameters, and Internet Protocol (IP) addresses of hub modems, NMS clients and servers, protocol processors and upstream routers, for example.

HNOs provide services to VNOs, including remote commissioning support, link budget preparation, hub equipment maintenance, upstream internet connection/private data connection maintenance, and coordination of software/firmware upgrades, for example. Further, HNOs have full visibility to all parts of the network using the NMS.

HNOs derive revenue from space segment operations, co-location services, and network management fees to VNOs. The network management fees include, for example, commissioning, configuration management, real-time monitoring, and periodic report generation fees, for example.

A Virtual Network Operator (VNO) is a "non-facilities" based provider of satellite network operator services that will be supported by the Host Network Operator business model. The VNO manages an independently managed, shared network and allocates network resources to users of that network. The VNO role is performed by sophisticated enterprise customers and service providers, and allows them to operate and manage state-of-the-art satellite networks. VNO is a low cost way of entering into a Satellite Network Operations business because much of the upfront capital investment has already been made, and VNOs can incrementally grow system capability as business opportunities grow. Further, the VNO business model provides greater control over end user networks, thereby providing better customer service.

VNOs are responsible for obtaining and maintaining a portion of the hardware and software in a satellite network, or VNOs contract those responsibilities to the HNO. In particular, at the shared multiport, VNOs are responsible for line cards, netmodems, network user equipment, and virtual NMS client software. VNOs support line card installation (through coordination with HNO, if necessary), commissioning of new remote sites, and support of all network user sites. VNOs manage all network user configuration, including rate shaping, network user IP address assignment (through coordination with HNO, if necessary), in-route timeplan and outroute frame configuration, Network Address Translation (NAT) and Dynamic Host Configuration Protocol (DHCP), for example. Further, VNOs coordinate software/firmware upgrades with HNO and SNP.

VNOs derive revenue from recurring enterprise service fees, installation and maintenance of network user equipment and software, and as a space segment reseller, for example.

Each network user on an independently managed, shared network typically receives service from a single VNO. For example, those services may include web hosting, content or DNS caching, data or video broadcast services, and other IP related services. Further, network users may also receive support, for example, commissioning support, help desk and technical support (e.g., during an outage), and changes or additions to QoS profiles.

The Shared Network Provider (SNP) performs a variety of tasks, including an initial survey of the shared multiport site, initial installation of equipment at the shared multiport site, broadband network operation training to HNOs and VNOs, ongoing technical support and consulting services to HNOs and VNOs, and software/firmware updates and maintenance, for example. In addition, the SNP may have visibility to all parts of the network through the NMS, at the discretion of the relevant HNO. Further, the SNP provides technical expertise to HNOs, for example including link budget and network architecture expertise.

Consulting services provided by the SNP include hub engineering design, initial network configuration, file server configuration and base band hub station installation, for example. Broadband network operation training includes NMS training, Time Division Multiple Access (TDMA) System training, Network Operations Center (NOC) training, for example. SNP provided maintenance services include broadband router software/firmware maintenance, NMS software maintenance, and protocol processor software/firmware maintenance, for example.

Figure 13A:
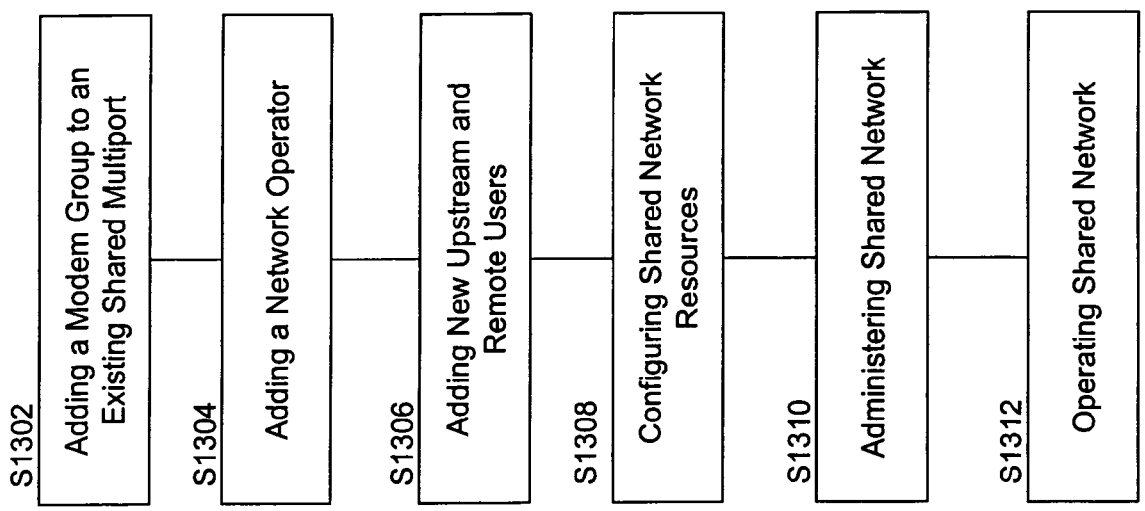
FIG. 13A is a flow diagram of a method according to an embodiment of the present invention.

FIG. 13A shows a possible embodiment of a shared independently administered business method of a communication system that includes shared independently administered networks, and in particular, a method of adding a new shared network to an existing satellite communications system. In step S1302 a HNO and VNO add a modem group to an existing shared multiport that is already connected via a satellite IF/RF converter to an existing satellite. The HNO selects a number of line cards and upstream and downstream carrier rates for the modem group as appropriate for the service level desired for the new network to be added. In step S1304 the HNO uses a hub network operator to allocate privileges to a new network operator and adds the operator to the communication system. In S1306, the VNO of the new network adds new upstream and remote user sites to the new network configuration using the new network operator, and in S1308, the VNO configures the network resources for operation according to the VNOs business goals. In S1310, the new network is administered, including system administration functions performed by the HNO and SNP, and network administration functions performed by the VNO. In step S1312, the new network is operated, including system monitoring functions performed by the SNP, billing functions performed by the HNO and VNO and communication functions performed by the users, for example.

Figure 13B:
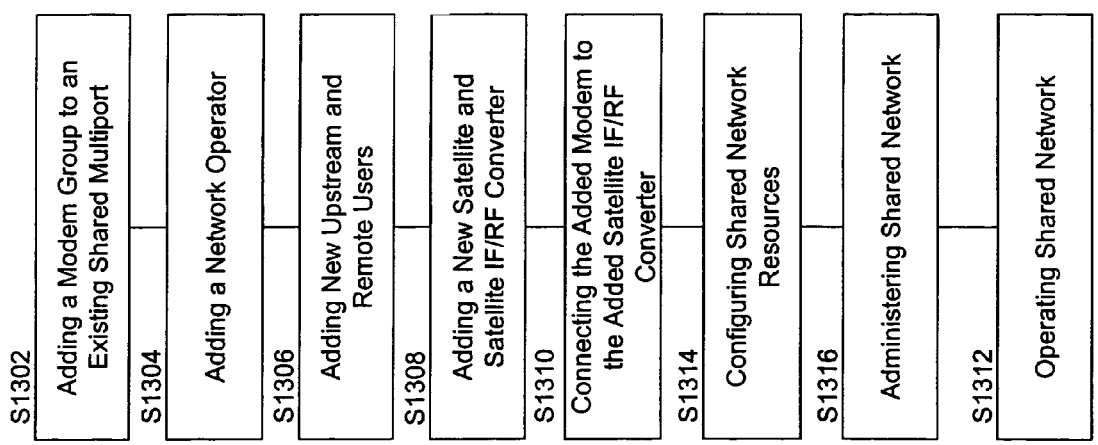
FIG. 13B is a flow diagram of a method according to another embodiment of the present invention.

FIG. 13B shows a further possible embodiment of a method of operating a communication system including shared independently administered communication networks, and in particular, an embodiment of a method to add a satellite, satellite IF/RF converters, and a modem group to an existing shared multiport to create a new shared network. Steps S1302 through S1312 are performed similarly to the steps in the embodiment of FIG. 13A. In step S1308 a new satellite and a new satellite IF/RF converter are added to the communication system and in step S1310 the added satellite IF/RF converter is connected to the new modem group in the existing shared multiport.

Thus, the existing shared multiport is reconfigured, with the addition of the new modem group, to operate with an additional new satellite not previously connected, and it is not necessary to add a new hub modem chassis for connection to an additional satellite, as required by background methods.

Figure 14:
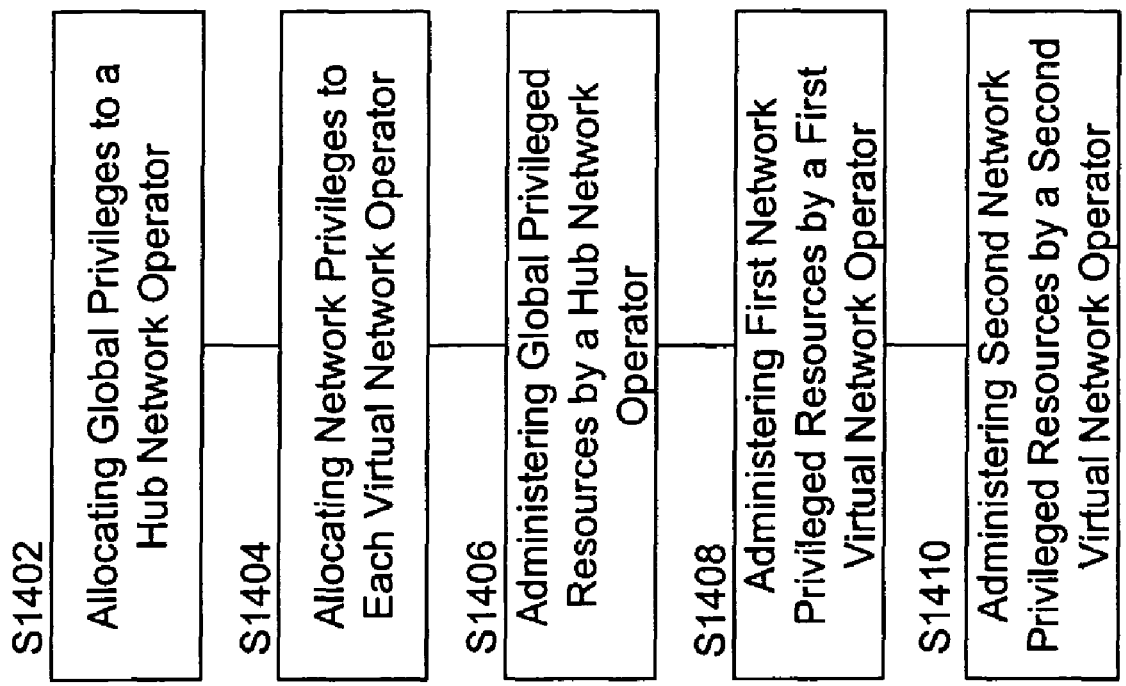
FIG. 14 is a flow diagram of a method according to another embodiment of the present invention.

FIG. 14 shows a possible embodiment of a method of configuring shared network resources, as shown in step S1308 in the embodiments of FIGS. 13A and 13B. In step S1402, global privileges (i.e., privileges to all resources in the communication system) are granted to a hub network operator by the SNP and the hub network operator is configured to have those privileges. In step S1404, the hub network operator grants certain privileges to observe and control network resources to each of the virtual network operators in the communication system. As discussed above, each virtual network operator is typically granted privileges to resources of its shared independently administered network. In step S1406, the hub network operator administers resources throughout the communication system, setting up those resources for operation with a shared network. In step S1408, a first virtual network operator administers resources throughout the first network, setting up those resources for operation, including activating/deactivating users, setting up IP addresses, etc . . . , as discussed above. In step S1410, a second network operator administers resources throughout the second network, setting up those resources for operation. The first virtual network operator does not have access to resources on the second network, and likewise, the second virtual network operator does not have access to resources on the first network. A hub network operator has access to all resources in the communication system, including first network resources and second network resources.

Figure 15:
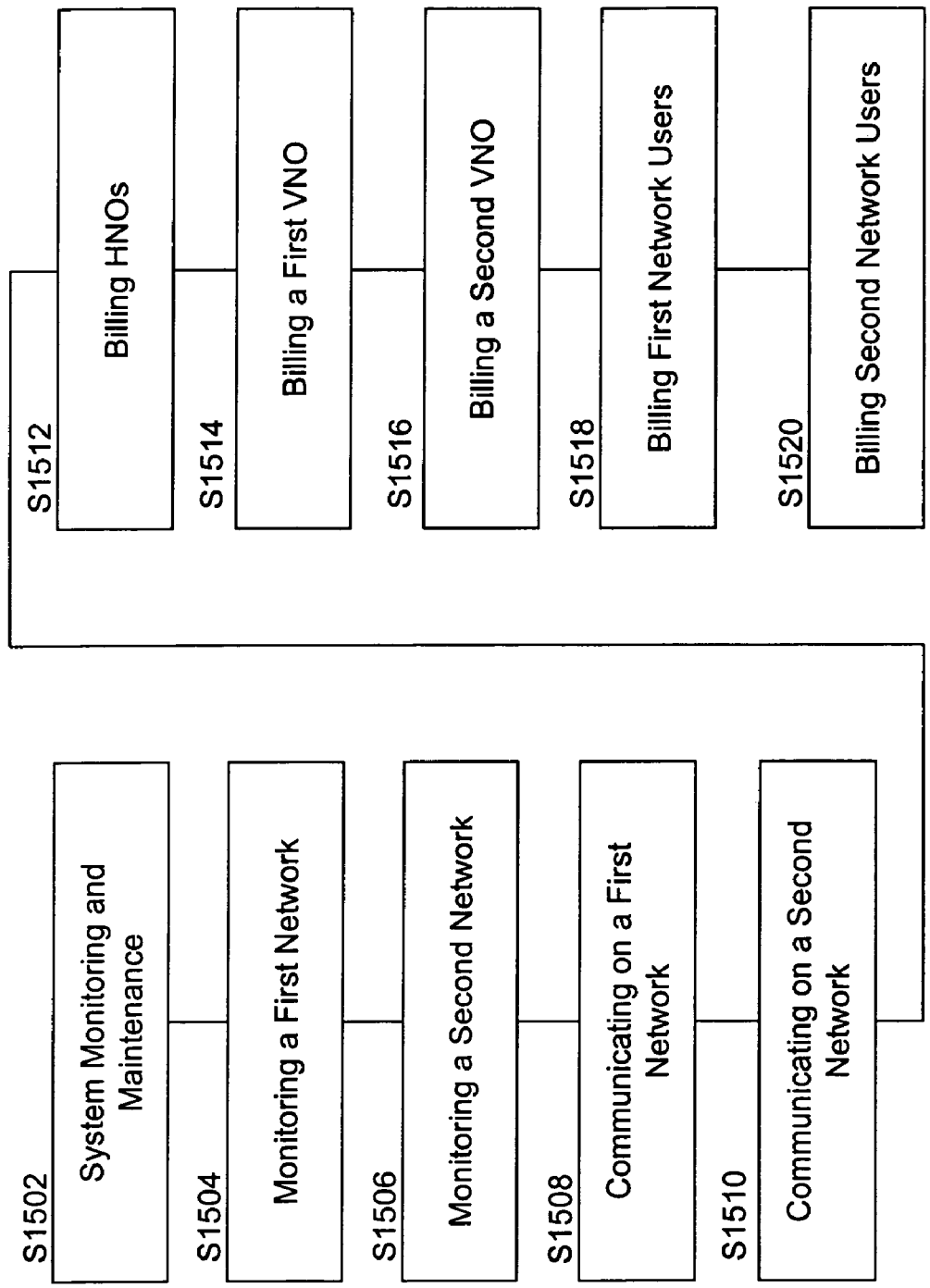
FIG. 15 is a flow diagram of a method according to another embodiment of the present invention.
Figure 16:
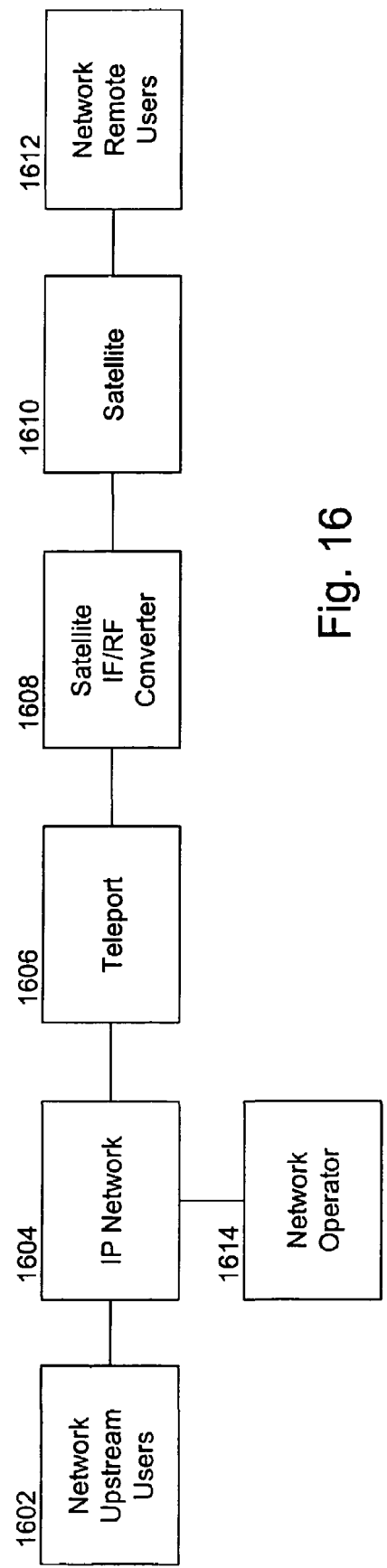
FIG. 16 is a block diagram of a background communication system.
Figure 17A:
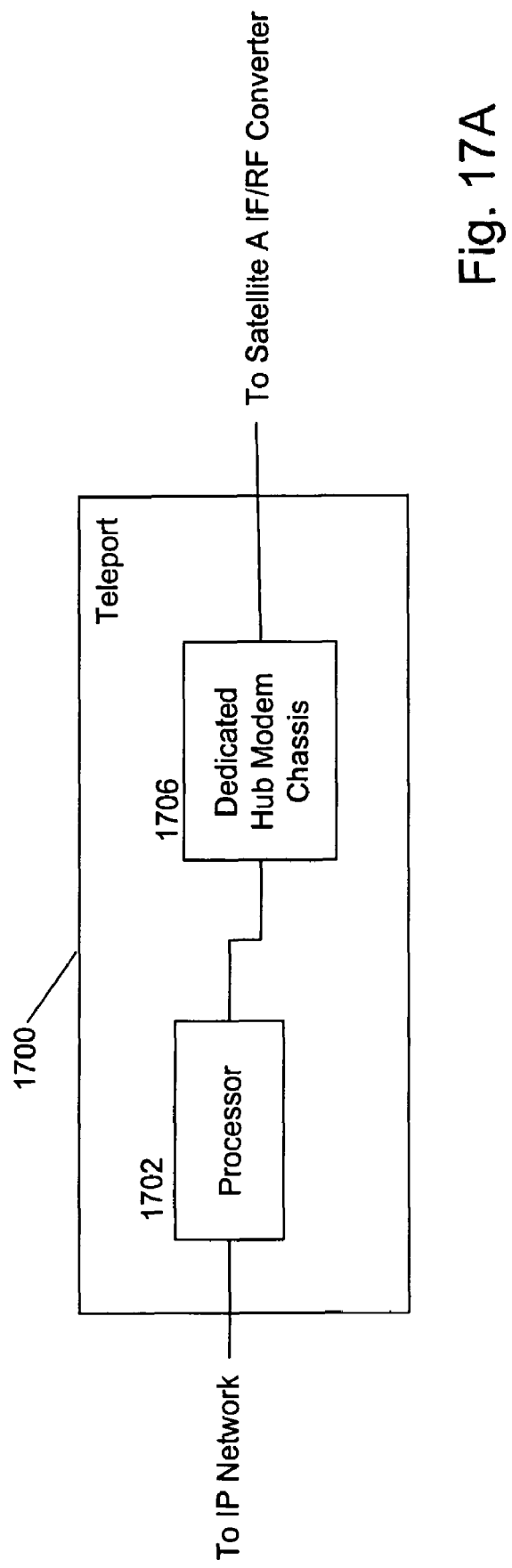
FIG. 17A is a block diagram of a background teleport.
Figure 17B:
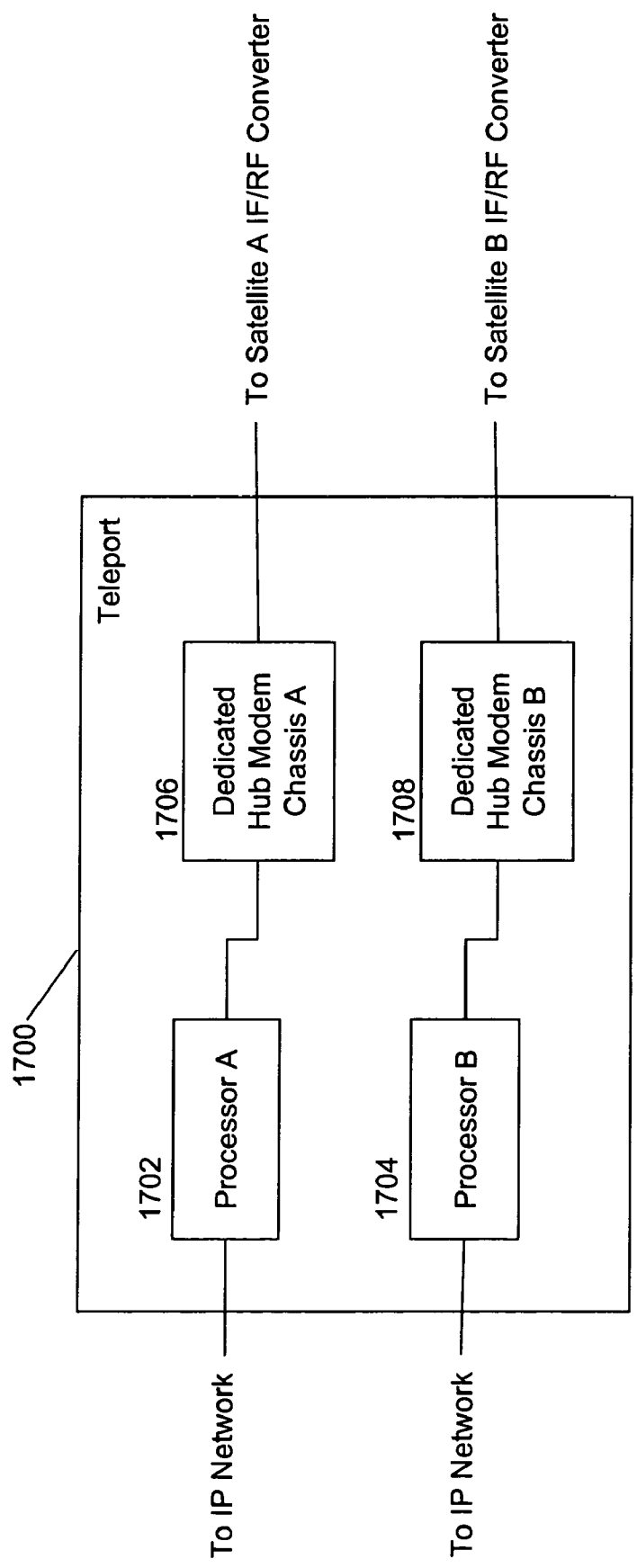
FIG. 17B is a block diagram of another background teleport.

FIG. 15 shows an example of operating a shared network, as in step S1312 in FIGS. 13A and 13B, according to a possible embodiment of the present invention. In step S1502 the SNP, HNO and VNOs perform system monitoring and maintenance functions including monitoring the health of system equipment and preparing periodic software and firmware upgrades to elements of the communication system. In step S1504, the HNO and a first virtual network operator further monitor the status of the first network to provide support to first network users. In step S1504, the HNO and a second virtual network operator further monitor the status of the second network to provide support to second network users. The first virtual network operator does not have access to users on the second network, and likewise, the second virtual network operator does not have access to users on the first network. In step S1512, SNPs bill the HNO for provided maintenance and monitoring services. In step S1514, the HNO bills a first VNO for first network communication resources allocated to the VNO and for usage of the first network as monitored by the HNO. In step S1516, the HNO bills a second VNO for second network communication resources allocated to the VNO and for usage of the second network as monitored by the HNO. In step S1518, the first VNO bills users of the first network based on monitored usage, and in step S1520, the second VNO bills users of the second network based on monitored usage.

Numerous modifications and variations of the present invention are possible in light of the above teachings. It is therefore to be understood that within the scope of the appended claims, the invention may be practiced otherwise than as specifically described herein.

The invention claimed is:

1. A communication system, comprising:

plural user stations each configured to communicate with remote user stations using a common equipment in a single housing having a communication capability, a performance of a communication conducted by each of the plural user stations is based on a currently allocated portion of the communication capability of the common equipment that is currently allocated to each of the plural user stations, and the performance of the communication conducted by each of the plural user stations includes a Quality of Service;

a memory that hosts a database configured to store an indication of the currently allocated portion of the communication capability that is allocated to each of the plural user stations and store an indication of a planned-to-be-allocated portion of the communication capability that is planned to be allocated in the future to at least a first user station in the plural user stations and that is not currently allocated to the first user station; and a portion changing mechanism configured to calculate a projected change in the Quality of Service in the performance of the communication conducted by each second user station other than the first user station in the plural user stations based on the stored indication of the planned-to-be-allocated portion of the communication capability that is planned to be allocated to the first user station in the future and that is not currently allocated to the first user station, store, in the database, the projected change in the Quality of Service in the performance of the communication conducted by each of the second user stations based on the stored indication of the planned-to-be-allocated portion of the communication capability that is planned to be allocated to the first user station in the future and that is not currently allocated to the first user station, inform each of the second user stations of the projected change in the Quality of Service, receive approval for the change from at least one of the second user stations in the plural second user stations, and change the currently allocated portion of the communication capability of the common equipment that is currently allocated to the first user station to be the planned-to-be-allocated portion after receiving the approval for the change from the at least one second user station.

2. A communication method, comprising steps of:

conducting a communication between a first user station in plural user stations and a remote user station using a common equipment in a single housing having a communication capability;

allocating a currently allocated portion of the communication capability of the common equipment to each of the plural user station, a performance of the communication conducted by the conducting being based on the currently allocated portion of the communication capability allocated to each of the plural user stations, and the performance of the communication conducted by the conducting includes a Quality of Service;

storing an indication of the currently allocated portion of the communication capability that is currently allocated to each of the plural user stations by the allocating;

storing an indication of planned-to-be-allocated portion of the communication capability that is planned to be allocated in the future to at least a first user station in the plural user stations and that is not currently allocated to the first user station;

calculating a projected change in the Quality of Service in the performance of the communication conducted by each second user station other than the first user station in the plural user stations based on the stored indication of the planned-to-be-allocated portion of the communication capability that is planned to be allocated to the first user station in the future and that is not currently allocated to the first user station;

storing the projected change in the Quality of Service in the performance of the communication conducted by each of the second user stations based on the stored indication of the planned-to-be-allocated portion of the communication capability that is planned to be allocated to the first user station in the future and that is not currently allocated to the first user station;

informing each of the second user stations of the projected change in the Quality of Service;

receiving approval for the change from at least one of the second user stations in the plural second user stations; and changing the currently allocated portion of the communication capability of the common equipment that is currently allocated to the first user station to be the planned-to-be-allocated portion after receiving the approval for the change form the at least one second user station.

3. A computer program product storing computer program instructions which when executed by a computer cause the computer to perform the following steps:

conducting a communication between a first user station in plural user stations and a remote user station using a common equipment in a single housing having a communication capability;

allocating a currently allocated portion of the communication capability of the common equipment to each of the plural user station, a performance of the communication conducted by the conducting being based on the currently allocated portion of the communication capability allocated to each of the plural user stations, and the performance of the communication conducted by the conducting includes a quality of Service;

storing an indication of the currently allocated portion of the communication capability that is currently allocated to each of the plural user stations by the allocating;

storing an indication of planned-to-be-allocated portion of the communication capability that is planned to be allocated in the future to at least a first user station in the plural user stations and that is not currently allocated to the first user station;

calculating a projected change in the Quality of Service in the performance of the communication conducted by each second user station other than the first user station in the plural user stations based on the stored indication of the planned-to-be-allocated portion of the communication capability that is planned to be allocated to the first user station in the future and that is not currently allocated to the first user station;

storing the projected change in the Quality of Service in the performance of the communication conducted by each of the second user stations based on the stored indication of the planned-to-be-allocated portion of the communication capability that is planned to be allocated to the first user station in the future and that is not currently allocated to the first user station;

informing each of the second user stations of the projected change in the Quality of Service;

receiving approval for the change from at least one of the second user stations in the plural second user stations; and changing the currently allocated portion of the communication capability of the common equipment that is currently allocated to the first user station to be the planned-to-be-allocated portion after receiving the approval for the change form the at least one second user station.

4. A configuration changing device in a communication system including plural user stations each configured to communicate with remote user stations using a common equipment in a single housing having a communication capability, a performance of a communication conducted by each of the plural user stations is based on a currently allocated portion of the communication capability of the common equipment that is currently allocated to each of the plural user stations, and the performance of the communication conducted by each of the plural user stations includes a Quality of Service, the configuration changing device comprising:

a memory storing an indication of the currently allocated portion of the communication capability that is allocated to each of the plural user stations and an indication of a planned-to-be-allocated portion of the communication capability that is planned to be allocated to at least a first user station in the plural user stations and that is not currently allocated to the first user station;

a portion changing mechanism configured to calculate a projected change in the Quality of Service in the performance of the communication conducted by each second user station other than the first user station in the plural user stations based on the stored indication of the planned-to-be-allocated portion of the communication capability of the common equipment in the single housing that is planned to be allocated to the first user station in the future and that is not currently allocated to the first user station, store, in a database, the projected change in the Quality of Service in the performance of the communication conducted by each of the second user stations based on the stored indication of the planned-to-be-allocated portion of the communication capability that is planned to be allocated to the first user station in the future and that is not currently allocated to the first user station, inform each of the second user stations of the projected change in the Quality of Service, receive approval for the change from at least one of the second user stations in the plural second user stations, and change the currently allocated portion of the communication capability of the common equipment that is currently allocated to the first user station to be the planned-to-be-allocated portion after receiving the approval for the change from the at least one second user station.

5. A communication system, comprising:

means for conducting a communication between plural user stations and remote user stations using a common equipment in a single housing having a communication capability, a performance of the communication is based on a currently allocated portion of the communication capability that is currently allocated to each of the plural user stations, and the performance includes a Quality of Service;

means for storing an indication of the currently allocated portion of the communication capability that is allocated to each of the plural user stations and store an indication of a planned-to-be-allocated portion of the communication capability that is planned to be allocated in the future to at least a first user station in the plural user stations and that is not currently allocated to the first user station;

means for calculating a projected change in the Quality of Service in the performance of the communication conducted by each second user station other than the first user station in the plural user stations based on the stored indication of the planned-to-be-allocated portion of the communication capability that is planned to be allocated to the first user station in the future and that is not currently allocated to the first user station;

means for storing the projected change in the Quality of Service in the performance of the communication conducted by each of the second user stations based on the stored indication of the planned-to-be-allocated portion of the communication capability that is planned to be allocated to the first user station in the future and that is not currently allocated to the first user station;

means for informing each of the second user stations of the projected change in the Quality of Service;

means for receiving approval for the change from at least one of the second user stations in the plural second user stations; and means for changing the currently allocated portion of the communication capability of the common equipment that is currently allocated to the first user station to be the planned-to-be-allocated portion after receiving the approval for the change from the at least one second user station.

6. A satellite communication system, comprising:

a satellite in earth orbit;

a shared hub having a communication capability and configured to communicate with the satellite;

an upstream terminal configured to communicate with the shared hub;

plural remote terminals configured to communicate with the upstream terminal via the satellite and the shared hub, a performance of a communication conducted by each of the plural remote terminals is based on a currently allocated portion of the communication capability of the shared hub that is currently allocated to each of the plural remote terminals, and the performance of the communication conducted by each of the plural remote terminals includes a Quality of Service; and a network manager configured to store an indication of the currently allocated portion or the communication capability of the shared hub that is allocated to each of the plural remote terminals, store an indication of a planned-to-be-allocated portion of the communication capability that is planned to be allocated in the future to at least a first remote terminal in the plural remote terminals and that is not currently allocated to the first remote terminal, calculate a projected change in the Quality of Service in the performance of the communication conducted by each second remote terminal other than the first remote terminal in the plural remote terminals based on the stored indication of the planned-to-be-allocated portion of the communication capability that is planned to be allocated to the first remote terminal in the future and that is not currently allocated to the first remote terminal, store the projected change in the Quality of Service in the performance of the communication conducted by each of the second remote terminals based on the stored indication of the planned-to-be-allocated portion of the communication capability that is planned to be allocated to the first remote terminal in the future and that is not currently allocated to the first remote terminal, inform each of the second remote terminals of the projected change in the Quality of Service, receive approval for the projected change from at least one of the second remote terminals in the plural remote terminals, and change the currently allocated portion of the communication capability of the shared hub that is currently allocated to the first remote terminal to be the planned-to-be-allocated portion after receiving the approval for the change from the at least one second remote terminal.

7. The system of claim 1, wherein the portion changing mechanism is further configured to change the currently allocated portion of the communication capability only at a prescheduled time.

8. The system of claim 1, wherein the planned-to-be-allocated portion of the communication capability includes a communication frequency range to be used in the future by the first user station to communicate using the common equipment.

9. The method of claim 2, further comprising:
changing the currently allocated portion of the communication capability only at a prescheduled time.

10. The method of claim 2, wherein the storing the indication of the planned-to-be-allocated portion of the communication capability includes storing a planned communication frequency range to be used in the future by the first user station to communicate using the common equipment.

11. The computer program product of claim 3, wherein the program instruction further cause the computer to perform:
changing the currently allocated portion of the communication capability only at a prescheduled time.

12. The computer program product of claim 3, wherein the program instruction further cause the computer to perform:
storing a planned communication frequency range to be used in the future by the first user station to communicate using the common equipment.

13. The device of claim 4, wherein the portion changing mechanism is further configured to change the currently allocated portion of the communication capability only at a prescheduled time.

14. The device of claim 4, wherein the planned-to-be-allocated portion of the communication capability includes a communication frequency range to be used in the future by the first user station to communicate using the common equipment.

15. The system of claim 5, wherein the means for changing changes the currently allocated portion of the communication capability only at a prescheduled time.

16. The system of claim 5, wherein the planned-to-be-allocated portion of the communication capability includes a communication frequency range to be used in the future by the first user station to communicate using the common equipment.

17. The system of claim 6, wherein the network manager is further configured to change the currently allocated portion of the communication capability only at a prescheduled time.

18. The system of claim 6, wherein the network manager is further configured to store a communication frequency range to be used in the future by the first user station to communicate using the common equipment as the planned-to-be-allocated portion of the communication capability.

* * * * *